(12) United States Patent
Horisaki et al.

(10) Patent No.: US 11,906,722 B2
(45) Date of Patent: Feb. 20, 2024

(54) ELECTROMAGNETIC WAVE DETERMINING DEVICE, FLOW CYTOMETER, ELECTROMAGNETIC WAVE DETERMINING METHOD, AND ELECTROMAGNETIC WAVE DETERMINING PROGRAM

(71) Applicants: OSAKA UNIVERSITY, Osaka (JP); The University of Tokyo, Tokyo (JP)

(72) Inventors: Ryoichi Horisaki, Osaka (JP); Jun Tanida, Osaka (JP); Sadao Ota, Tokyo (JP)

(73) Assignees: OSAKA UNIVERSITY, Osaka (JP); The University of Tokyo, Tokyo (JP)

( * ) Notice: Subject to any disclaimer, the term of this patent is extended or adjusted under 35 U.S.C. 154(b) by 0 days.

(21) Appl. No.: 18/056,432

(22) Filed: Nov. 17, 2022

(65) Prior Publication Data

US 2023/0213747 A1    Jul. 6, 2023

Related U.S. Application Data

(63) Continuation of application No. 16/542,257, filed on Aug. 15, 2019, now Pat. No. 11,549,880, which is a (Continued)

(30) Foreign Application Priority Data

Feb. 17, 2017    (JP) ................. 2017-028245

(51) Int. Cl.
*G02B 21/14*    (2006.01)
*G06F 18/214*    (2023.01)
(52) U.S. Cl.
CPC ......... *G02B 21/14* (2013.01); *G01N 15/1434* (2013.01); *G06F 18/214* (2023.01)

(58) Field of Classification Search
CPC .............. G01N 15/14; G01N 15/1434; G01N 2015/144; G01N 2015/145;
(Continued)

(56) References Cited

U.S. PATENT DOCUMENTS 9,069,175 B2 *    6/2015    Koebler ................. G02B 21/14
9,134,242 B2 *    9/2015    Shaffer ............... G01B 11/2441
(Continued)

FOREIGN PATENT DOCUMENTS

EP    3264031 A1    1/2018
EP    3499201 A1    6/2019
(Continued)

OTHER PUBLICATIONS

CN201880012120.X Chinese Office Action dated Dec. 23, 2021.
(Continued)

*Primary Examiner* — Michael P Stafira
(74) *Attorney, Agent, or Firm* — WILSON SONSINI GOODRICH & ROSATI

(57) ABSTRACT

An electromagnetic wave detecting device comprising: an emission unit configured to emit electromagnetic waves having coherence; an electromagnetic wave modulating unit configured to modulate one or both of a phase and an amplitude of the emitted electromagnetic waves and to change a state of the modulation relative to an imaging target; and a post-modulation electromagnetic wave intensity detecting unit configured to detect an intensity of post-modulation electromagnetic waves, which are the modulated electromagnetic waves acquired by modulating the electromagnetic waves emitted from the emission unit using the imaging target and the electromagnetic wave modulating unit, using one pixel.

20 Claims, 17 Drawing Sheets

Related U.S. Application Data continuation of application No. PCT/JP2018/005237, filed on Feb. 15, 2018.

(58) Field of Classification Search
CPC ............ G01N 2015/149; G01N 21/41; G01N 2015/1006; G01N 15/1404; G01N 2015/1409; G01N 2015/1413; G01N 2015/1415; G01N 15/1459; G01N 21/455; G01N 21/64; G01N 15/0227; G01N 15/1463; G01N 15/147; G01N 15/1475; G01N 15/1484; G01N 2015/025; G01N 2015/0294; G01N 2015/1493; G01N 2015/1497; G01N 2021/4153; G01N 21/4133; G01N 2201/126; G01N 21/6428; G01N 15/1436; G01N 21/6456; G01N 2021/6439; G01N 21/6402; G01N 15/1429; G01N 21/6458; G01N 2021/6463; G01N 2021/6441; G01N 21/6486; G01N 2201/0612; G01N 2015/1454; G01N 2015/1452; G01N 2015/1447; G01N 2015/1486; G01N 15/0272; G01N 15/1468; G01N 15/1456; G01N 2015/0003; G01N 2015/0011; G01N 2015/03; G01N 2015/1081; G01N 2015/142; G01N 2015/1422; G01N 2015/1438; G01N 2015/1445; G01N 21/532; G01N 15/1056; G01N 15/0612; G01N 33/4836; G01N 33/5088; G01N 2015/1488; G01N 21/45; G01N 27/4146; G01N 2015/0065; G01N 21/4795; G01N 21/6452; G01N 21/6454; G01N 2201/0635; G01N 15/0211; G01N 15/06; G01N 2015/0693; G01N 21/1702; G01N 21/4788; G01N 2291/02475; G01N 29/06; G01N 29/0672; G01N 29/2418; G01N 33/5008; G01N 33/56972; G01N 33/57407; G01N 33/57411; G01N 1/34; G01N 2500/04; G01N 2500/10; G01N 33/54373; G01N 15/1427; G01N 2015/1443; G01N 2015/1477; G01N 2021/8887; G01N 21/8851; G01N 29/449; G01N 29/48; G01N 1/2208; G01N 1/4077; G01N 15/0255; G01N 2015/0046; G01N 2015/0233; G01N 2015/0261; G01N 33/502; G01N 33/5091; G01N 33/54366; G01N 2021/0346; G01N 21/05; G01N 21/453; G01N 2333/4742; G01N 2333/71; G01N 33/5017; G01N 33/542; G01N 33/54306; G01N 33/56966; G01N 33/57415; G01N 33/57423; G01N 33/57434; G01N 33/57446; G01N 33/57492; G01N 33/57496; G01N 1/286; G01N 1/44; G01N 2001/2866; G01N 2001/2873; G01N 2035/00356; G01N 2035/0463; G01N 2291/011; G01N 2291/0232; G01N 2291/02818; G01N 2291/044; G01N 27/82; G01N 29/024; G01N 29/028; G01N 29/032; G01N 29/11; G01N 29/12; G01N 29/42; G01N 35/00732; G01N 35/0099; G01N 1/10; G01N 11/02; G01N 11/10; G01N 11/16; G01N 15/00; G01N 15/10; G01N 2011/008; G01N 2015/0053; G01N 2015/0092; G01N 2015/105; G01N 2015/1093; G01N 2021/0106; G01N 2021/0181; G01N 2021/0193; G01N 2021/1727; G01N 2021/178; G01N 21/01; G01N 21/0303; G01N 21/1717; G01N 21/47; G01N 21/88; G01N 2223/42; G01N 2291/0427; G01N 23/083; G01N 23/2273; G01N 2333/515; G01N 2458/10; G01N 29/221; G01N 29/225; G01N 29/2456; G01N 33/48; G01N 33/5005; G01N 33/5011; G01N 33/5029; G01N 33/5044; G01N 33/5047; G01N 33/5076; G01N 33/5082; G01N 33/53; G01N 33/54326; G01N 33/569; G01N 33/582; G01N 9/002; G02B 21/14; G02B 21/00; G02B 21/06; G02B 21/0032; G02B 21/16; G02B 21/361; G02B 21/367; G02B 21/0076; G02B 21/082; G02B 21/36; G02B 27/425; G02B 5/1866; G02B 27/52; G02B 27/62; G02B 27/646; G02B 30/33; G02B 6/0048; G02B 6/0068; G02B 6/009; G02B 21/26; G02B 21/0088; G02B 21/34; G02B 21/364; G02B 26/0833; G02B 7/08; G02B 2027/0138; G02B 2027/014; G02B 2027/0185; G02B 27/0093; G02B 27/0172; G02B 27/0179; G02B 21/0012; G02B 21/18; G02B 21/362; G02B 27/1086; G02B 27/12; G02B 27/46; G02B 5/003; G02B 5/1814; G02B 21/365; G02B 26/06; G02B 30/00; G02B 5/32; G06F 18/214; G06F 17/18; G05F 1/70

See application file for complete search history.

(56) References Cited

U.S. PATENT DOCUMENTS

| | | | |
|---|---|---|---|
| 9,518,916 B1 | 12/2016 | Pandev et al. | |
| 11,549,880 B2* | 1/2023 | Horisaki | ............... G01N 15/14 |
| 2009/0290156 A1 | 11/2009 | Popescu et al. | |
| 2012/0200857 A1* | 8/2012 | Sharpe | ............... G01N 15/1434 |
| | | | 356/436 |
| 2013/0016335 A1 | 1/2013 | Lo et al. | |
| 2013/0102865 A1* | 4/2013 | Mandelis | ........... G01N 21/1702 |
| | | | 600/328 |
| 2013/0163844 A1 | 6/2013 | Ozaki et al. | |
| 2015/0182178 A1 | 7/2015 | Baturin et al. | |
| 2015/0276387 A1 | 10/2015 | Kletter et al. | |
| 2016/0125615 A1* | 5/2016 | Shigaki | .................... G06T 7/62 |
| | | | 348/79 |
| 2017/0221194 A1 | 8/2017 | Ebstein | |
| 2017/0328826 A1 | 11/2017 | Diebold et al. | |

FOREIGN PATENT DOCUMENTS

| | | | | |
|---|---|---|---|---|
| JP | 2003526091 A | | 9/2003 | |
| JP | 2004286731 A | | 10/2004 | |
| JP | 2005069832 A | | 3/2005 | |
| JP | 2007281634 A | | 10/2007 | |
| JP | 2011229409 A | | 11/2011 | |
| JP | 2011229410 A | | 11/2011 | |
| JP | 2013128438 A | | 7/2013 | |
| JP | 2015036799 A | | 2/2015 | |
| JP | 2016090292 A | * | 5/2016 | ............ G01N 15/14 |
| JP | 2018132501 A | | 8/2018 | |
| JP | WO2018181458 A1 | | 2/2020 | |
| WO | WO-2010032452 A1 | | 3/2010 | |
| WO | WO-2011028109 A1 | * | 3/2011 | ........... G02B 21/002 |
| WO | WO-2015068834 A1 | | 5/2015 | |
| WO | WO-2015148560 A1 | | 10/2015 | |
| WO | WO-2016136801 A1 | | 9/2016 | |

(56) References Cited

FOREIGN PATENT DOCUMENTS

OTHER PUBLICATIONS

EP18753550.5 Extended European Search Report dated Feb. 19, 2020.
Katkovnik V, Astola J, Compressive sensing computational ghost imaging, J.Opt. Soc. Am. A, Jul. 12, 2012, vol. 29, No. 8, pp. 1556-1567.
Marco F. Duarte et al: "Single-pixel imaging via compressive sampling",IEEE Signal Processing Magazine., vol. 25, No. 2, Mar. 2008 (Mar. 2008), pp. 83-91, XP055666482, US ISSN: 1053-5888, DOI: 10.1109/MSP.2007.914730.
Mehrdad Abolbashari: "High dynamic range compressive imaging: aprogrammable imaging system", Optical Engineering., vol. 51, No. 7, Jun. 11, 2012 (Jun. 11, 2012), p. 071407, XP055667050, Bellingham ISSN: 0091-3286,DOI: 10.1117/1.OE.51.7.071407.
Office Action JP 2020-170808 dated Sep. 21, 2021.
PCT/JP2018/005237 International Search Report dated May 1, 2018.
Pian Qi et al.: "Time-resolved hyperspectral single-pixel camera implementationfor compressive wide-field fluorescence lifetime imaging", Progress Inbiomedical Optics and Imaging, SPIE—International Societyfor Optical Engineering, Bellingham, WA, US, vol. 9701, Mar. 7, 2016 (Mar. 7, 2016), pp. 970115-970115, XP060064436, ISSN: 1605-7422, DOI: 10.1117/12.2217686 ISBN: 978-1-5106-0027-0.
R. Horisaki et al., Single-shot phase imaging with a coded aperture, OPTICSLETTERS, vol. 39, No. 22, Nov. 15, 2014.
U.S. Appl. No. 16/542,257 Notice of Allowance dated Aug. 30, 2022.
U.S. Appl. No. 16/542,257 Notice of Allowance dated Nov. 17, 2022.
U.S. Appl. No. 16/542,257 Office Action dated Nov. 16, 2021.
Vladimir Katkovnik et al: "Compressive sensing computational ghost imaging",Aug. 2012 (Aug. 2012), pp. 1-62, XP055219023, DOI:10.1364/JOSAA.29.001556 Retrieved from the Internet: URL: https://pdfs.semanticscholar.org/4568/1fbc1143924f13c1800b8c1008be6c1241d8.pdf.

\* cited by examiner

ELECTROMAGNETIC WAVE DETERMINING DEVICE, FLOW CYTOMETER, ELECTROMAGNETIC WAVE DETERMINING METHOD, AND ELECTROMAGNETIC WAVE DETERMINING PROGRAM

CROSS-REFERENCE

This application is a continuation of U.S. patent application Ser. No. 16/542,257, filed Aug. 15, 2019, now U.S. Pat. No. 11,549,880, which is a continuation of International Application No. PCT/JP2018/005237, filed Feb. 15, 2018, which claims priority to Japanese Patent Application No. 2017-028245, filed on Feb. 17, 2017, the entire contents of which are herein incorporated.

TECHNICAL FIELD

The present invention relates to an electromagnetic wave determining device, a flow cytometer, an electromagnetic wave determining method, and an electromagnetic wave determining program.

BACKGROUND ART

Conventionally, technologies for generating a complex amplitude representing a phase and an amplitude of electromagnetic waves scattered on an imaging target on the basis of a captured image and a random pattern by emitting the electromagnetic waves onto the imaging target and imaging electromagnetic waves acquired by causing the emitted electromagnetic waves to be scattered on the imaging target through a scattering plate having the random pattern of different sizes for attenuating the electromagnetic waves for each area are known (for example, Non-Patent Document 1).

CITATION LIST

Non-Patent Literature

[Non-Patent Document 1]
Single-shot phase imaging with a coded aperture (OPTICS LETTERS/Vol. 39, No. 22/Nov. 15, 2014)

SUMMARY OF INVENTION

Technical Problem

In the conventional technologies, a phase and an amplitude of electromagnetic waves are reconfigured on the basis of information of an intensity of the electromagnetic waves acquired from an imaging device including a plurality of pixels. However, there is a problem in that it is difficult to manufacture an imaging device including a plurality of pixels depending on the frequency of the electromagnetic waves to be determined.

An object of the present invention is to provide an electromagnetic wave determining device, a flow cytometer, an electromagnetic wave determining method, and an electromagnetic wave determining program capable of acquiring a signal in which a phase and an amplitude of electromagnetic waves are included regardless of the frequency of the electromagnetic waves.

Solution to Problem

According to one aspect of the present invention, there is provided an electromagnetic wave detecting device comprising: an emission unit configured to emit electromagnetic waves having coherence; an electromagnetic wave modulating unit configured to modulate one or both of a phase and an amplitude of the emitted electromagnetic waves and to change a state of the modulation relative to an imaging target; and a post-modulation electromagnetic wave intensity detecting unit configured to detect an intensity of post-modulation electromagnetic waves, which are the modulated electromagnetic waves acquired by modulating the electromagnetic waves emitted from the emission unit using the imaging target and the electromagnetic wave modulating unit, using one pixel.

In addition, according to one aspect of the present invention, in the electromagnetic wave detecting device described above, a machine learning unit configured to perform machine learning of a plurality of intensities of the post-modulation electromagnetic waves detected by the post-modulation electromagnetic wave intensity detecting unit; and an identification unit identifying the imaging target on the basis of a result of the machine learning performed by the machine learning unit and the plurality of intensities of the post-modulation electromagnetic waves detected by the post-modulation electromagnetic wave intensity detecting unit are further included.

In addition, according to one aspect of the present invention, in the electromagnetic wave detecting device described above, a generation unit generating complex amplitude information representing at least a phase and an amplitude of the electromagnetic waves from the imaging target on the basis of a plurality of intensities of the post-modulation electromagnetic waves, information representing each electromagnetic wave modulating unit when the intensity is detected, and contribution information representing a degree of contribution of the modulation of the electromagnetic wave modulating unit is further included.

In addition, according to one aspect of the present invention, in the electromagnetic wave detecting device described above, the generation unit generates the complex amplitude information by performing a sparsity-constrained operation based on sparsity of the imaging target.

In addition, according to one aspect of the present invention, in the electromagnetic wave detecting device described above, the emission unit emits the electromagnetic waves passing through the electromagnetic wave modulating unit to the imaging target.

In addition, according to one aspect of the present invention, in the electromagnetic wave detecting device described above, the emission unit emits the electromagnetic waves passing through the imaging target to the electromagnetic wave modulating unit.

In addition, according to one aspect of the present invention, in the electromagnetic wave detecting device described above, a change unit changing a pattern included in the electromagnetic wave modulating unit to a pattern corresponding to the imaging target is further included.

In addition, according to one aspect of the present invention, in the electromagnetic wave detecting device described above, the electromagnetic wave modulating unit is an electromagnetic wave modulating unit that has a random pattern.

In addition, according to one aspect of the present invention, in the electromagnetic wave detecting device described above, the electromagnetic wave modulating unit has a first state which represents a state of the modulation and a second state which represents a state of the modulation different from the first state and the post-modulation electromagnetic wave intensity detecting unit detects at least an intensity of first post-modulation electromagnetic waves that represents an intensity of the post-modulation electromagnetic waves modulated by the imaging target and the electromagnetic wave modulating unit in the first state and an intensity of second post-modulation electromagnetic waves that represents an intensity of the post-modulation electromagnetic waves modulated by the imaging target and the electromagnetic wave modulating unit in the second state.

In addition, according to one aspect of the present invention, there is provided a flow cytometer including: the electromagnetic wave detecting device described above; and a flow path in which an observation target flows as the imaging target, wherein the emission unit of the electromagnetic wave detecting device emits the electromagnetic waves to the flow path, and the post-modulation electromagnetic wave intensity detecting unit detects the electromagnetic waves emitted to the flow path.

In addition, according to one aspect of the present invention, there is provided an electromagnetic wave detecting method including: an emission step of emitting electromagnetic waves having coherence; an electromagnetic wave modulating step of changing a state of the modulation of the electromagnetic wave modulating unit modulating one or both of a phase and an amplitude of the emitted electromagnetic wave relative to an imaging target; and a post-modulation electromagnetic wave intensity detecting step of detecting an intensity of post-modulation electromagnetic waves, which are the modulated electronic waves acquired by modulating the electromagnetic waves emitted in the emission step using the imaging target and the electromagnetic wave modulating unit, using one pixel.

In addition, according to one aspect of the present invention, there is provided an electromagnetic wave detecting program causing a computer to execute: an emission step of emitting electromagnetic waves having coherence; an electromagnetic wave modulating step of changing a state of the modulation of the electromagnetic wave modulating unit modulating one or both of a phase and an amplitude of the emitted electromagnetic waves relative to an imaging target; and a post-modulation electromagnetic wave intensity detecting step of detecting an intensity of post-modulation electromagnetic waves, which are the modulated electromagnetic waves acquired by modulating the electromagnetic waves emitted in the emission step using the imaging target and the electromagnetic wave modulating unit, using one pixel.

Advantageous Effects of Invention

According to the present invention, an electromagnetic wave determining device, a flow cytometer, an electromagnetic wave determining method, and an electromagnetic wave determining program capable of acquiring a signal in which a phase and an amplitude of electromagnetic waves are included regardless of the frequency of the electromagnetic waves.

DESCRIPTION OF EMBODIMENTS

Hereinafter, an electromagnetic wave determining device according to an embodiment will be described with reference to the drawings.

Figure 1:
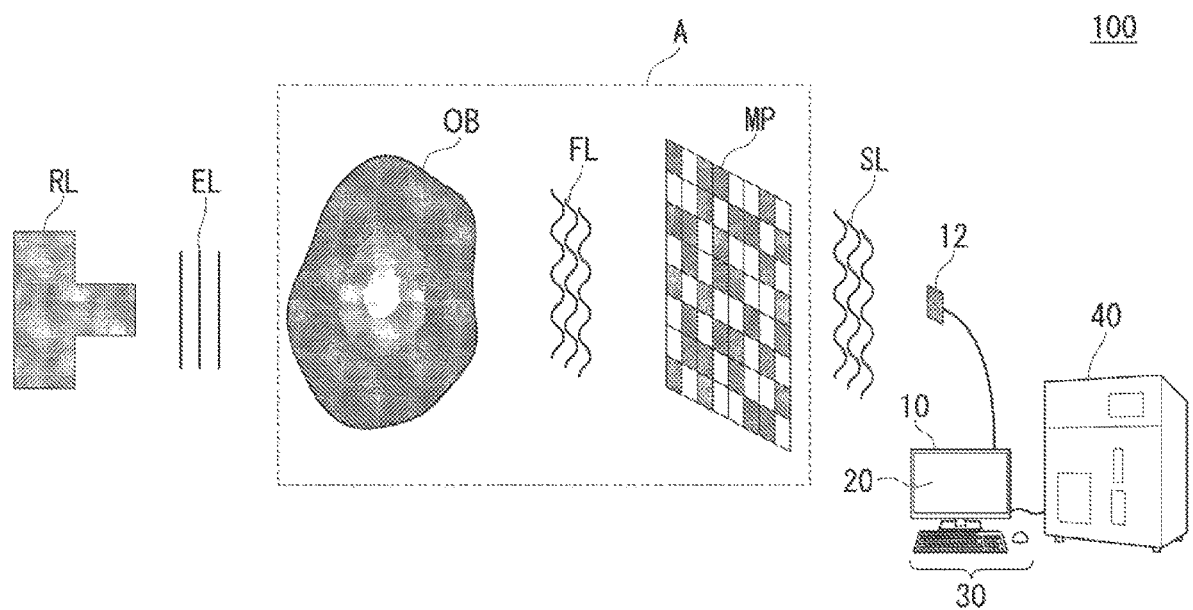
FIG. 1 is a diagram showing one example of the configuration of an electromagnetic wave determining system.

FIG. 1 is a diagram showing one example of the configuration of an electromagnetic wave determining system 100.

The electromagnetic wave determining system 100 determines electromagnetic waves modulated by an imaging target OB and an electromagnetic wave modulating unit MP. The electromagnetic wave determining system 100 reconfigures information of a phase or an amplitude of the imaging target OB on the basis of the intensity of the determined electromagnetic waves and the electromagnetic wave modulating unit MP.

More specifically, the electromagnetic wave determining system 100 emits electromagnetic waves EL emitted from an emission unit RL onto the imaging target OB. These electromagnetic waves EL are electromagnetic waves having coherence. These electromagnetic waves EL may be electromagnetic waves having coherence in part. In other words, the emission unit RL emits coherent light. The phase or the amplitude of the electromagnetic waves EL emitted from the emission unit RL is modulated in accordance with the imaging target OB. Here, modulation represents causing a change in the phase or the amplitude of electromagnetic waves. The phase or the amplitude of the electromagnetic waves FL that have been modulated in accordance with the imaging target OB is modulated by the electromagnetic wave modulating unit MP. The electromagnetic wave modulating unit MP modulates one or both of the phase and the amplitude of emitted electromagnetic waves EL. A modulation state of the electromagnetic wave modulating unit MP changes relative to an imaging target OB. The electromagnetic waves modulated by the imaging target and the electromagnetic wave modulating unit MP may be referred to also as post-modulation electromagnetic waves SL.

The post-modulation electromagnetic wave intensity determination unit 12 determines an intensity of these post-modulation electromagnetic waves SL. In the following description, the intensity of the post-modulation electromagnetic waves SL will be referred to also as intensity information. The post-modulation electromagnetic wave intensity determination unit 12 is a determinator that determines the intensity of the post-modulation electromagnetic waves using one pixel. The post-modulation electromagnetic wave intensity determination unit 12 supplies the determined intensity information to the electromagnetic wave determining device 10.

The electromagnetic wave determining device 10 acquires the intensity information from the post-modulation electromagnetic wave intensity determination unit 12. The electromagnetic wave determining device 10 processes a signal of the intensity information. The electromagnetic wave determining device 10 supplies a result of the process to the flow cytometer 40. The flow cytometer 40 analyzes the imaging target OB on the basis of a result supplied from the electromagnetic wave determining device 10. In the following description, a configuration in which electromagnetic waves are emitted from the emission unit RL to the electromagnetic wave modulating unit MP through the imaging target OB will be referred to also as a structured determination configuration.

In the electromagnetic wave determining system 100, the arrangement of the imaging target OB and the electromagnetic wave modulating unit MP included in a broken line part A may be reversed. More specifically, electromagnetic waves EL emitted from the emission unit RL are modulated by the electromagnetic wave modulating unit MP. The imaging target OB modulates the electromagnetic waves modulated by the electromagnetic wave modulating unit MP. The post-modulation electromagnetic wave intensity determination unit 12 determines the post-modulation electromagnetic waves SL modulated by the imaging target OB. In the following description, a configuration in which electromagnetic waves are emitted from the emission unit RL to the imaging target OB through the electromagnetic wave modulating unit MP will be referred to also as a structured illumination configuration.

In the configuration of the structured determination and the configuration of the structured illumination described above, the imaging target OB and the electromagnetic wave modulating unit MP do not move in an advancing direction of the electromagnetic waves EL. In other words, in the configuration of the structured determination and the configuration of the structured illumination, a relative position between the imaging target OB and the electromagnetic wave modulating unit MP does not change.

In addition, the electromagnetic wave modulating unit MP does not change while the post-modulation electromagnetic wave intensity determination unit 12 is determining the intensity of post-modulation electromagnetic waves SL. The electromagnetic wave modulating unit MP changes after the post-modulation electromagnetic wave intensity determination unit 12 determines the intensity of the post-modulation electromagnetic waves SL.

Next, one example of the intensity information determined by the post-modulation electromagnetic wave intensity determination unit 12 will be described with reference to FIG. 2.

Figure 2:
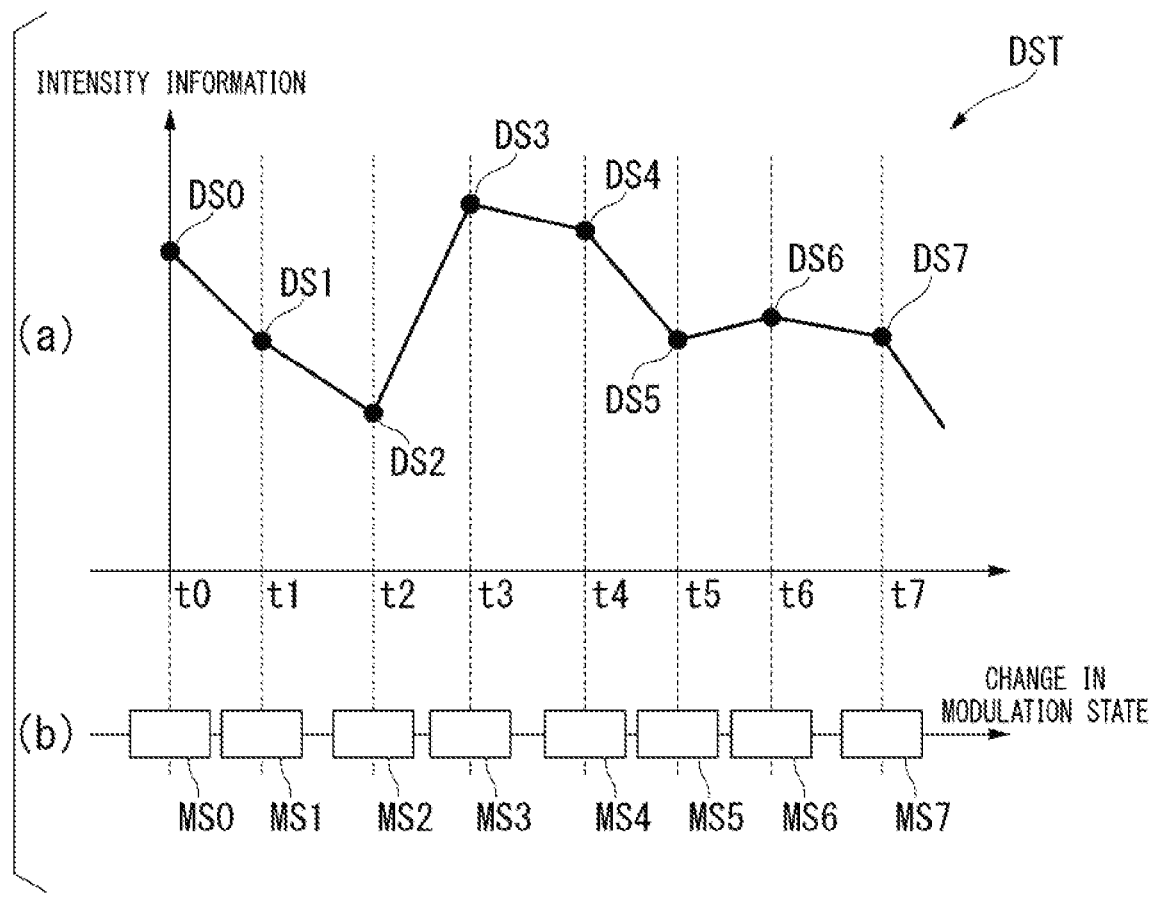
FIG. 2 is a diagram showing one example of combined intensity information.

FIG. 2 is a diagram showing one example of combined intensity information DST.

FIG. 2(a) is a graph in which a plurality of pieces of intensity information DS are aligned in order of acquisition times at which the plurality of pieces of intensity information DS are acquired. FIG. 2(b) is a graph in which modulation states MS are aligned in order of output time. The combined intensity information DST is information in which times of the plurality of pieces of intensity information DS shown in FIG. 2(a) and times of the modulation states MS shown in FIG. 2(b) are associated with each other.

In this example, information of intensity information DS0 to intensity information DS7 is included in the combined intensity information DST. The post-modulation electromagnetic wave intensity determination unit 12 determines the intensity information DS0 at a time t0. The electromagnetic wave modulating unit MP is in a modulation state MS0 when determining the intensity information DS0.

The post-modulation electromagnetic wave intensity determination unit 12, similar to the time t0, determines intensity information DS at a time t1 to a time t7. In addition, the electromagnetic wave modulating unit MP is in different modulation states MS at the time t0 to the time t7. In other words, the electromagnetic wave modulating unit MP modulates one or both of the phase and the amplitude of electromagnetic waves EL in different states from the modulation state MS0 to the electromagnetic wave modulating unit MP7.

In other words, there are a first state representing a modulation state MS and a second state of which the modulation state MS is different from the first state in the electromagnetic wave modulating unit MP.

The post-modulation electromagnetic wave intensity determination unit 12 determines an intensity of first post-modulation electromagnetic waves SL representing an intensity DS of post-modulation electromagnetic waves modulated by the imaging target OB and the electromagnetic wave modulating unit MP of the first state. In addition, the post-modulation electromagnetic wave intensity determination unit 12 determines at least an intensity of second post-modulation electromagnetic waves SL representing an intensity DS of post-modulation electromagnetic waves modulated by the imaging target OB and the electromagnetic wave modulating unit MP of a second state.

First Embodiment

[Configuration of Electromagnetic Wave Determining Device of Structured Determination]

Next, one example of a case in which the electromagnetic wave phase amplitude generating device 10 has a structured determination configuration will be described with reference to FIG. 3.

Figure 3:
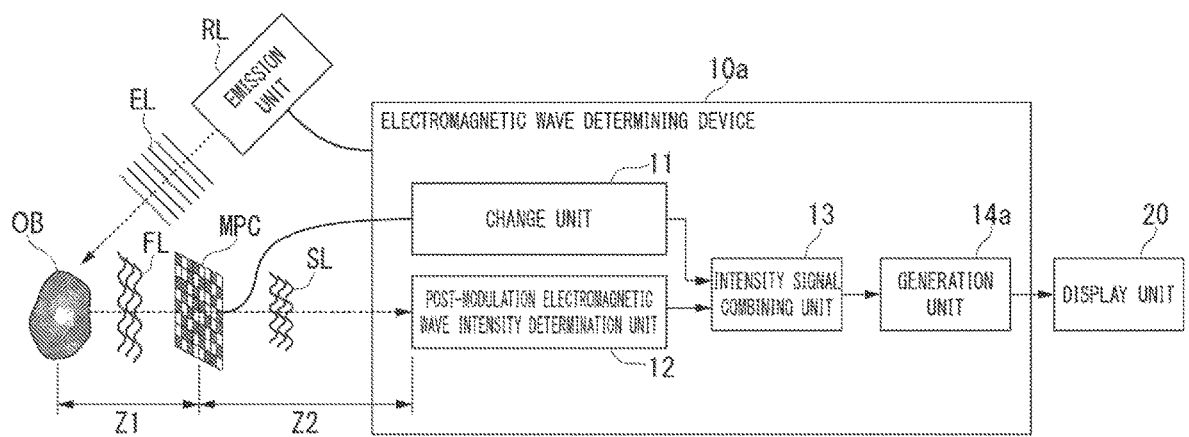
FIG. 3 is a diagram showing one example of the configuration of an electromagnetic wave determining device having a structured determination configuration.

FIG. 3 is a diagram showing one example of the configuration of an electromagnetic wave determining device 10a having a structured determination configuration.

The electromagnetic wave determining device 10a includes an emission unit RL, a variable electromagnetic wave modulating unit MPC, a change unit 11, a post-modulation electromagnetic wave intensity determination unit 12, an intensity signal combining unit 13, and a generation unit 14a.

The emission unit RL emits electromagnetic waves EL onto an imaging target OB. The imaging target OB is a sample that is observed by the electromagnetic wave determining device 10a. More specifically, the imaging target OB is a biological sample that is opaque or colorless and transparent, a material or matter that is a non-biological sample, or the like. Here, an electromagnetic wave EL is at least one of a visible ray, an X ray, an electron ray, an ultraviolet ray, an infrared ray, a terahertz wave, a millimeter wave, and a microwave. The electromagnetic waves EL described above are not limited thereto and may be electron waves of a certain wavelength. In this example, a case in which the electromagnetic waves are visible rays will be described. In the following description, visible rays may be simply referred to as light.

The variable electromagnetic wave modulating unit MPC changes one or both of the phase and the amplitude of emitted electromagnetic waves. The variable electromagnetic wave modulating unit MPC is an electromagnetic wave modulating unit MP of which a modulation state can be changed. More specifically, the variable electromagnetic wave modulating unit MPC is a spatial light modulator. The spatial light modulator is a device that changes a modulation state MS of the variable electromagnetic wave modulating unit MPC in accordance with a current, a voltage, an electric signal, or the like that is applied. More specifically, the variable electromagnetic wave modulating unit MPC has a plurality of areas in which degrees of modulation of emitted electromagnetic waves are different from each other. In the following description, the plurality of areas will be described also as a pattern. This area is divided into squares.

The change unit 11 changes the modulation state MS of the variable electromagnetic wave modulating unit MPC. The change unit 11 supplies modulation state information representing a modulation state MS of the variable electromagnetic wave modulating unit MPC to the intensity signal combining unit 13.

The post-modulation electromagnetic wave intensity determination unit 12 determines post-modulation electromagnetic waves SL. As described above, the post-modulation electromagnetic waves SL are electromagnetic waves acquired by modulating electromagnetic waves FL passing through an imaging target OB using the variable electromagnetic wave modulating unit MPC. The post-modulation electromagnetic wave intensity determination unit 12 is a one-pixel determinator. More specifically, the post-modulation electromagnetic wave intensity determination unit 12 is a single light determinator.

The post-modulation electromagnetic wave intensity determination unit 12 supplies intensity information of the determined post-modulation electromagnetic waves SL to the intensity signal combining unit 13.

The intensity signal combining unit 13 acquires modulation state information from the change unit 11. The intensity signal combining unit 13 acquires intensity information DS from the post-modulation electromagnetic wave intensity determination unit 12. The intensity signal combining unit 13 generates combined intensity information DST in which the intensity information DS and the modulation state information, which have been acquired, are the latest information. The intensity signal combining unit 13 stores the generated combined intensity information DST. The intensity signal combining unit 13 supplies the stored combined intensity information DST to the generation unit 14a.

The generation unit 14a generates complex amplitude information representing at least a phase and an amplitude of electromagnetic waves from an imaging target OB on the basis of a plurality of intensities of post-modulation electromagnetic waves, modulation state information representing a modulation state MS when each of the intensities is determined, and contribution information representing a degree of contribution of modulation of the variable electromagnetic wave modulating unit MPC. More specifically, the generation unit 14a acquires combined intensity information DST from the intensity signal combining unit 13. The generation unit 14a calculates a complex amplitude including information of a phase or an amplitude of an imaging target OB on the basis of the combined intensity information DST. More specifically, the generation unit 14a generates complex amplitude information representing at least a phase and an amplitude of electromagnetic waves FL from the imaging target OB on the basis of the combined intensity information DST and the contribution information representing a degree of contribution of modulation of the electromagnetic wave modulating unit MP.

The contribution information is information representing a degree of modulation of light emitted from a point light source having a point disposed at a certain position as a light source at a predetermined position on the electromagnetic wave modulating unit MP. More specifically, the contribution information is information representing impulse responses of Fresnel propagation at a plurality of positions on the variable electromagnetic wave modulating unit MPC to which light from a point light source is emitted. More specifically, light from a point light source is emitted to each pixel of the variable electromagnetic wave modulating unit MPC, and the contribution information is information representing an impulse response of Fresnel propagation for each pixel.

The generation unit 14a generates information of a phase or an amplitude of an imaging target OB on the basis of the information of the calculated complex amplitude. The generation unit 14a causes the display unit 20 to display generated information of the phase or the amplitude as image information. The display unit 20 displays image information generated by the generation unit 14a.

[Overview of Operation of Electromagnetic Wave Determining Device of Structured Determination]

Next, an overview of the operation of the electromagnetic wave determining device 10a of structured determination will be described with reference to FIG. 4.

Figure 4:
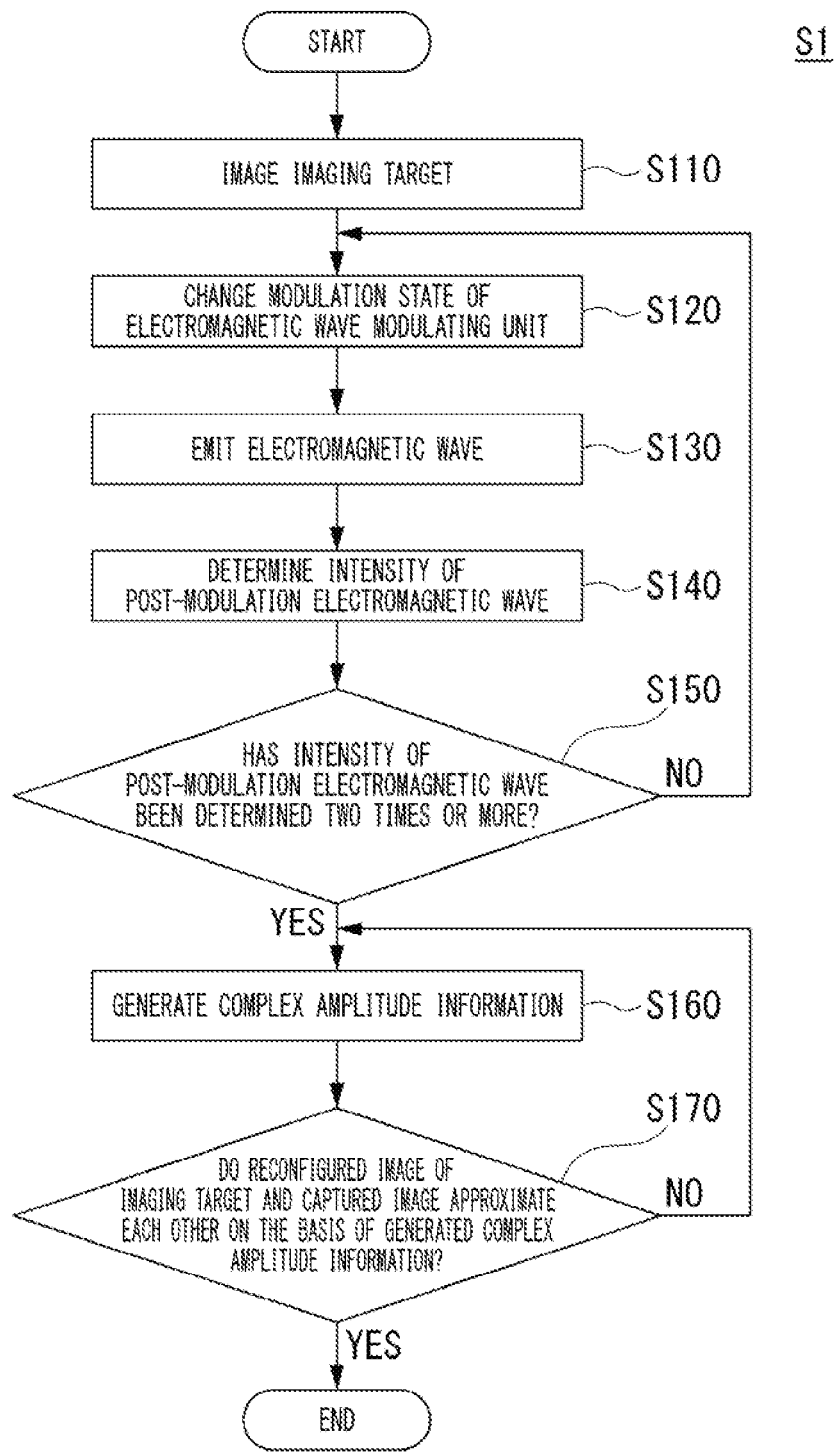
FIG. 4 is a flowchart showing one example of an operation of an electromagnetic wave determining device.

FIG. 4 is a flowchart S1 showing one example of an operation of the electromagnetic wave determining device 10a.

An imaging target OB is imaged by an imaging unit not shown in the drawing. The imaging unit not shown in the drawing outputs a captured image to the generation unit 14a (Step S110).

The change unit 11 changes a modulation state MS of the variable electromagnetic wave modulating unit MPC. The change unit 11 supplies the changed modulation state MS to the intensity signal combining unit 13 (Step S120).

The emission unit RL emits electromagnetic waves EL to the imaging target OB and the variable electromagnetic wave modulating unit MPC (Step S130).

The electromagnetic waves EL are modulated by the imaging target OB and the variable electromagnetic wave modulating unit MPC. The post-modulation electromagnetic wave intensity determination unit 12 determines post-modulation electromagnetic waves SL that are the modulated electromagnetic waves. The post-modulation electromagnetic wave intensity determination unit 12 supplies intensity information DS that is an intensity of the determined post-modulation electromagnetic waves SL to the intensity signal combining unit 13 (Step S140).

The intensity signal combining unit 13 acquires the intensity information DS from the post-modulation electromagnetic wave intensity determination unit 12.

The intensity signal combining unit 13 acquires a modulation state MS when the intensity information DS is determined from the change unit 11. The intensity signal combining unit 13 generates combined intensity information DST on the basis of the intensity information DS and the modulation state MS that have been acquired. In a case in which two or more determination results of intensity information DS are not included in the generated combined intensity information DST (Step S150: No), the intensity signal combining unit 13 repeats the processes of Step S120 to Step S150.

On the other hand, in a case in which two or more determination results of intensity information DS are included in the generated combined intensity information DST (Step S150: Yes), the intensity signal combining unit 13 supplies the combined intensity information DST to the generation unit 14a.

The generation unit 14a calculates complex amplitude information on the basis of the combined intensity information DST supplied from the intensity signal combining unit 13 (Step S160). A method of calculating complex amplitude information will be described later.

The generation unit 14a generates information of a phase or an amplitude for the imaging target OB on the basis of the information of the calculated complex amplitude. The generation unit 14a reconfigures an image of the imaging target on the basis of the generated information of the amplitude. The generation unit 14a compares the reconfigured image of the imaging target OB with the captured image captured in Step S110 described above.

In a case in which the reconfigured image of the imaging target OB and the captured image do not approximate each other as a result of the comparison (Step S170: No), the generation unit 14a repeats the process from Step S160.

On the other hand, in a case in which the reconfigured image of the imaging target OB and the captured image approximate each other as a result of the comparison (Step S170: Yes), the generation unit 14a ends the process.

In addition, any one of the process of Step S120 and the process of Step S130 described above may be performed first. In addition, in Step S150, one or more determination results may be included in the combined intensity information DST. The post-modulation electromagnetic wave intensity determination unit 12 may determine intensity information DS a predetermined number of times. For example, the predetermined number of times may be the number of times that is set in accordance with an imaging target OB in advance.

In addition, in Step S170, in the process of comparing the reconfigured image of the imaging target OB with the captured image, complex amplitude information may be calculated a plurality number of times, and the image of the imaging target OB may be reconfigured on the basis of the information of amplitudes calculated the predetermined number of times. Furthermore, in Step S170, a person operating the electromagnetic wave determining device 10a may observe an image of the imaging target OB displayed on the display unit 20 and end the process of Step S170 when a desired image is acquired.

[Method of Calculating Complex Amplitude Information of Structured Determination Configuration]

Next, a method of calculating the complex amplitude information using the generation unit 14a in Step S160 described above will be described with reference to FIGS. 5 to 7.

Figure 5:
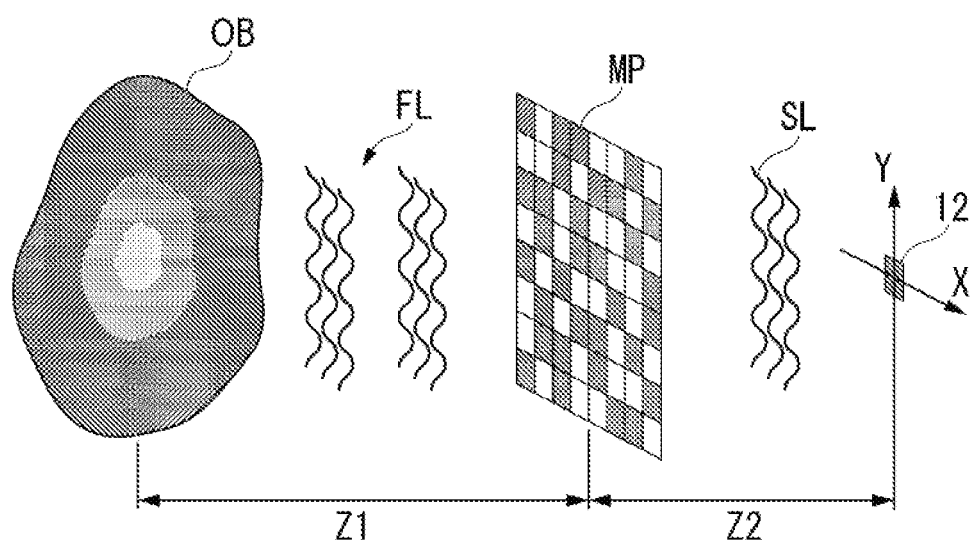
FIG. 5 is a diagram showing positional relations among an imaging target, a variable electromagnetic wave modulating unit, and a post-modulation electromagnetic wave intensity determination unit.

FIG. 5 is a diagram showing positional relations among an imaging target OB, a variable electromagnetic wave modulating unit MPC, and the post-modulation electromagnetic wave intensity determination unit 12.

A case will be described in which a distance between the imaging target OB and the variable electromagnetic wave modulating unit MPC is a distance z1, and a distance between the variable electromagnetic wave modulating unit MPC and the post-modulation electromagnetic wave intensity determination unit 12 is a distance z2. This similarly applies also to the distance z1 in the following description.

Electromagnetic waves FL modulated by the imaging target OB propagates the distance z1. Post-modulation electromagnetic waves SL are electromagnetic waves acquired by modulating the electromagnetic waves FL modulated by the imaging target OB by the variable electromagnetic wave modulating unit MPC. These post-modulation electromagnetic waves SL propagates the distance z2.

The generation unit 14a performs a sparsity-constrained operation based on sparsity of the imaging target OB on the basis of the plurality of pieces of intensity information DS and modulation states MS included in the combined intensity information DST, thereby generating information representing a phase and an amplitude of the imaging target OB. More specifically, the generation unit 14a generates complex amplitude information of the imaging target OB on the basis of Equations (1), (2), (3), and (4).

[Math. 1]

$$a = P_{z1} f \quad (1)$$

Equation (1) is an equation that represents a forward problem, in other words, a problem predicted using a mathematical model.

Here, f included in Equation (1) is complex amplitude information of the imaging target OB. This similarly applies also to fin the following equations.

In addition, a included in Equation (1) is a signal representing a complex amplitude on a certain plane in the middle of propagation of electromagnetic waves modulated by the imaging target OB in the variable electromagnetic wave modulating unit MPC. This similarly applies also to a in the following equations. In the following description, this a is also referred to as an auxiliary plane a. More specifically, a included in Equation (1) is complex amplitude information assumed at a position of the variable electromagnetic wave modulating unit MPC that is away from the imaging target OB by the distance z1.

In addition, $P_{z1}$ included in Equation (1) is a Toeplitz matrix representing Fresnel propagation from the imaging target OB to the variable electromagnetic wave modulating unit MPC. This similarly applies also to $P_{z1}$ in the following equations. More specifically, $P_{z1}$ is Toeplitz matrix having contribution information as its row component.

[Math. 2]

$$|g|^2 = |MP_{z2} a|^2 \quad (2)$$

Equation (2), similar to Equation (1) described above, is a forward problem.

Here, $|g|^2$ included in Equation (2) is intensity information DS representing an intensity of the post-modulation electromagnetic waves SL determined by the post-modulation electromagnetic wave intensity determination unit 12. More specifically, the intensity information DS is information acquired by squaring the absolute value of the amplitude of the post-modulation electromagnetic waves SL. This applies also to $|g|^2$ in the following equations.

In addition, g included in Equation (2) is complex amplitude information representing a phase and an amplitude of electromagnetic waves SL determined by the post-modulation electromagnetic wave intensity determination unit 12. This similarly applies also to g in the following equations. In the following description, complex amplitude information representing a phase and an amplitude of post-modulation electromagnetic waves SL determined by the post-modulation electromagnetic wave intensity determination unit 12 may be simply referred to as complex amplitude information g.

In addition, M included in Equation (2) is a matrix representing the modulation state MS of the electromagnetic wave modulating unit MP. In this embodiment, this M is a matrix representing a modulation state MS of the variable electromagnetic wave modulating unit MPC. This M will be described later.

In addition, $P_{z2}$ included in Equation (1) is a diagonal matrix representing Fresnel propagation from the variable electromagnetic wave modulating unit MPC to the post-modulation electromagnetic wave intensity determination unit 12. This similarly applies also to $P_{z2}$ in the following equations. More specifically, $P_{z2}$ is a matrix having contribution information as its diagonal component.

By solving Equation (1) and Equation (2) described above, the complex amplitude information g is generated. The forward problems represented in Equation (1) and Equation (2) are nonlinear problems, and thus there are cases in which the problems cannot be easily solved. Thus, in this example, by solving an optimization problems represented in Equations (3) and (4), complex amplitude information g is generated.

[Math. 3]

$$\hat{f} = \mathrm{argmin}_f \|a - P_{z1}f\|\ell_2 + \tau \Psi[f] \tag{3}$$

Equation (3) is an equation that represents an inverse problem, in other words, a problem estimating mathematical model from data. Equation (3) represents an optimization problem estimating a complex amplitude f hat of an imaging target OB from an auxiliary plane on the variable electromagnetic wave modulating unit MPC.

Here, $\Psi[f]$ included in Equation (3) is a sparsity constrain. More specifically, $\Psi[f]$ is a regularized function based on the sparsity of information representing a signal of the imaging target OB. In addition, τ included in Equation (3) is a regularization parameter for regularization. These similarly apply to R(f) and τ in the following equations.

In addition, $l_2$ included in Equation (3) is an $l_2$ norm. This similarly applies to $l_2$ in the following equations.

[Math. 4]

$$\hat{g} = \mathrm{argmin}_g \||g|^2 - |MP_{z2}a|^2\|\ell_2 \tag{4}$$

Equation (4), similar to Equation (3), is an inverse problem. In Equation (4), a complex amplitude g hat on the post-modulation electromagnetic wave intensity determination unit 12 is estimated from $|g|^2$ that is the intensity information DS and the complex amplitude of the auxiliary plane a.

R(f) included in Equation (2) is a sparsity constraint. More specifically, R(f) is a regularization based on sparsity of information representing a signal of the imaging target OB. In addition, τ included in Equation (2) is a parameter for regularization. These similarly applies to R(f) and τ in the following equations.

In other words, the generation unit 14a performs a sparsity-constrained operation based on the sparsity of the imaging target OB, thereby generating complex amplitude information g of the post-modulation electromagnetic waves SL. In addition, the generation unit 14a generates a sparsity-constrained operation using a known technique. For example, the generation unit 14a performs a sparsity-constrained operation using a known sparsity solver.

[Regarding Contribution Information]

Next, contribution information included in $P_{z1}$ described above will be described.

The contribution information included in Equation (1) described above can be represented using Equation (5).

[Math. 5]

$$h_{z1}(x, y, z1) = \frac{\exp(i2\pi r_1 \lambda^{-1})}{r_1} \frac{z1}{r_1}\left(\frac{1}{2\pi r_1} + \frac{1}{i\lambda}\right) \tag{5}$$

Here, $r_1$ included in Equation (5) can be represented using Equation (6). This $r_1$ represents a distance between the post-modulation electromagnetic wave intensity determination unit 12 and a certain position on variable electromagnetic wave modulating unit MPC. This similarly applies also to $r_1$ in the following equations.

In addition, $h_{z1}$ included in Equation (5) is contribution information included in $P_{z1}$. More specifically, $h_{z1}$ is an impulse response function of Fresnel propagation. As described above, $P_{z1}$ is a Toeplitz matrix having this $h_{z1}$ as its matrix component.

[Math. 6]

$$r_1 = (x^2 + y^2 + z1^2)^{1/2} \tag{6}$$

Here, x included in Equation (5) and Equation (6) is a distance between the post-modulation electromagnetic wave intensity determination unit 12 and a certain position on the variable electromagnetic wave modulating unit MPC in a direction X. This similarly applies also to x in the following equations.

In addition, y included in Equation (5) and Equation (6) is a distance between the post-modulation electromagnetic wave intensity determination unit 12 and a certain position on the variable electromagnetic wave modulating unit MPC in a direction Y. This similarly applies also to y in the following equations.

In other words, x is a distance between a pixel disposed at the distance x from the post-modulation electromagnetic wave intensity determination unit 12 in the direction of the X axis and the post-modulation electromagnetic wave intensity determination unit 12. In addition, y is a distance between the position of a pixel disposed at the distance y from the post-modulation electromagnetic wave intensity determination unit 12 in the direction of the Y axis and the post-modulation electromagnetic wave intensity determination unit 12.

Next, the contribution information included in $P_{z2}$ described above will be described.

The contribution information included in $P_{z2}$ can be represented using Equation (7).

[Math. 7]

$$h_{z2}(x_2, y_2, z2) = \frac{\exp(i2\pi r_2 \lambda^{-1})}{r_2} \frac{z2}{r_2}\left(\frac{1}{2\pi r_2} + \frac{1}{i\lambda}\right) \quad (7)$$

Here, $r_2$ included in Equation (7) can be represented using Equation (8). This $r_2$ represents a distance between the imaging target OB and a certain position on the variable electromagnetic wave modulating unit MPC. This similarly applies also to $r_2$ in the following equations.

In addition, $h_{z2}$ included in Equation (7) is contribution information included in $P_{z2}$. More specifically, $h_{z2}$ is an impulse response function of Fresnel propagation. As described above, $P_{z2}$ is a diagonal matrix having this $h_{z2}$ as its diagonal component.

[Math. 8]

$$r_2 = (x_2^2 + y_2^2 + z2^2) \quad (8)$$

Here, $x_2$ included in Equation (7) and Equation (8) is a distance between the imaging target OB and a certain position on the variable electromagnetic wave modulating unit MPC in the direction X. This similarly applies also to $x_2$ in the following equations.

In addition, $y_2$ included in Equation (7) and Equation (8) is a distance between the imaging target OB and a certain position on variable electromagnetic wave modulating unit MPC in the direction Y. This similarly applies also to $y_2$ in the following equations.

In other words, $x_2$ is a distance between a pixel disposed at the distance $x_2$ from the post-modulation electromagnetic wave intensity determination unit 12 in the direction of the X axis and the imaging target OB. In addition, $y_2$ is a distance between the position of a pixel disposed at the distance $y_2$ from the post-modulation electromagnetic wave intensity determination unit 12 in the direction of the Y axis and the imaging target OB.

[Regarding Complex Amplitude Information of Imaging Target OB]

Here, the complex amplitude information of an imaging target OB described above will be described.

The complex amplitude information of the imaging target OB is a matrix represented in Equation (9).

[Math. 9]

$$f \in \mathbb{C}^{N \times 1} \quad (9)$$

Here, N included in Equation (9) is the number of pixels of an image reconfigured by the generation unit 14. This similarly applies also to N in the following equations.

[Complex Amplitude Information g]

Next, the complex amplitude information g described above will be described.

The complex amplitude information g is a matrix represented in Equation (10).

[Math. 10]

$$g \in \mathbb{C}^{K \times 1} \quad (10)$$

Here, K included in Equation (10) is the number of times of determination of post-modulation electromagnetic waves SL using the post-modulation electromagnetic wave intensity determination unit 12. In other words, K is the number of pieces of the intensity information DS and the number of pieces of the information of modulation states MS included in the combined intensity information DST. This similarly applies also to K in the following equations.

[Regarding Electromagnetic Wave Modulating Unit MP]

Next, a matrix M included in Equation (2) described above will be described with reference to FIG. 6.

Figure 6:
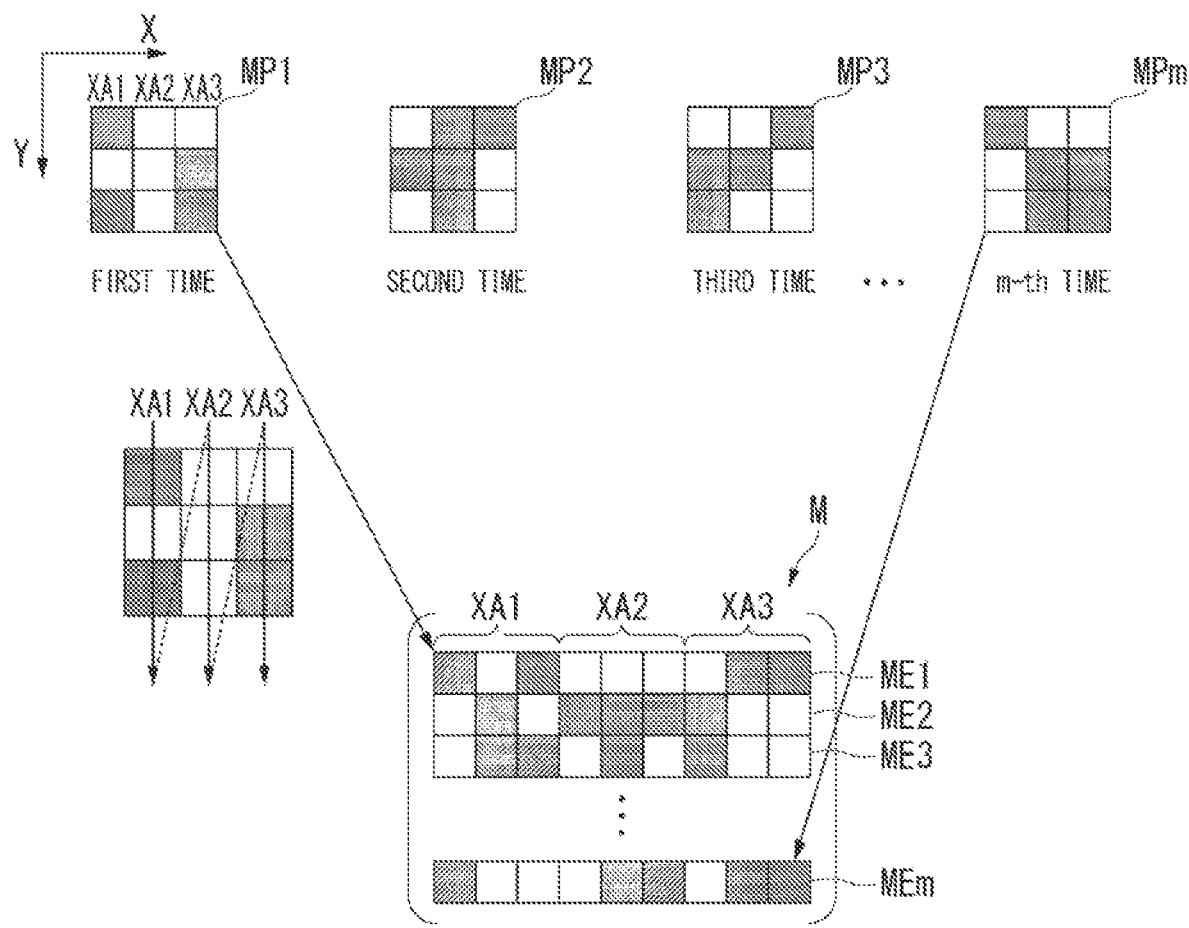
FIG. 6 is a diagram showing one example of a matrix M.

FIG. 6 is a diagram showing one example of the matrix M. In FIG. 6, XY axes having a plane on which the electromagnetic wave modulating unit MP extends as axes of orthogonal coordinates are shown.

The matrix M is a matrix representing a degree of modulation at each position on the electromagnetic wave modulating unit MP. More specifically, the matrix M is a matrix represented in Equation (11).

[Math. 11]

$$M \in \mathbb{C}^{K \times N} \quad (11)$$

As shown in FIG. 6, an electromagnetic wave modulating unit MP1 is in a modulation state MS that is a modulation state when intensity information DS is determined at the first time. An electromagnetic wave modulating unit MP2 is in a modulation state MS that is a modulation state when intensity information DS is determined at the second time. An electromagnetic wave modulating unit MP3 is in a modulation state MS that is a modulation state when intensity information DS is determined at the third time. An electromagnetic wave modulating unit MPm is in a modulation state MS that is a modulation state when intensity information DS is determined at the m-th time.

The matrix M is a matrix including values representing degrees of modulation of the electromagnetic wave modulating units MP of the electromagnetic wave modulating unit MP1 to the electromagnetic wave modulating unit MPm. For example, in the case of a pattern in which the electromagnetic wave modulating unit MP1 to the electromagnetic wave modulating unit MPm modulate amplitudes of light, a value representing a degree of modulation is a value represented using numerical values of "0" indicating no transmission of emitted light to "1" indicating scattering of the light with the amplitude maintained. In the case of a pattern in which a phase of light is modulated, a value representing a degree of modulation is a value represented using a numerical value of 0 to 1 corresponding to a degree of modulation of the phase of emitted light.

A value representing the degree of modulation of the electromagnetic wave modulating unit MP1 is input to an element ME1 of the first row of the matrix M. More specifically, values acquired by scanning values representing degrees of amplitudes included in columns XA1 to XA3 of the electromagnetic wave modulating unit MP1 in a row direction are input to the element ME1. Here, a column direction is the direction of the X axis having an upper left side of the electromagnetic wave modulating unit MP1 as its origin. In addition, the row direction is a direction of the Y axis having the upper left of the electromagnetic wave modulating unit MP1 as its origin.

Similar to the element ME1, values representing degrees of modulation of the electromagnetic wave modulating unit MP2 to the electromagnetic wave modulating unit MPm are input to elements ME2 to MEm.

[Specific Example of Operation of Electromagnetic Wave Determining Device]

[Solution Using Auxiliary Plane]

Up to now, the overview of the operation of the generation unit 14a has been described.

In the following description, the generation unit 14a generates complex amplitude information g hat using alternating projections.

The generation unit 14a alternately calculates Equation (3) and Equation (4) described above, thereby generating complex amplitude information of an imaging target OB. More specifically, the generation unit 14a solves Equation (3) using a TwIST method using all the variations in a regularized function. The TwIST method is a general solution of compressed sensing. The generation unit 14a solves Equation (4) using a G-S method, thereby estimating complex amplitude g hat. Here, the G-S method is a repetitive-type phase estimating method.

More specifically, the generation unit 14a sets a provisional value as an initial value in the complex amplitude information g hat included in Equation (4). The provisional value of the complex amplitude information g hat as an initial value may be any value. The generation unit 14a assumes an auxiliary plane a at the position of the variable electromagnetic wave modulating unit MPC. The generation unit 14a substitutes the auxiliary plan a of this provisional value in Equation (3). The generation unit 14a solves Equation (3) using the TwIST method, thereby generating f hat of a provisional value. The TwIST method is a general solution of compressed sensing.

The generation unit 14a causes f hat of the provisional value to propagate. The generation unit 14a generates an auxiliary plane a on the basis of Equation (3) using f hat of the provisional value caused to have propagated as an initial value.

In other words, the generation unit 14a substrates a random value in the initial value of the complex amplitude information g, thereby generating an auxiliary plane a using the G-S method. The generation unit 14a substitutes the generated auxiliary plan a into Equation (3), thereby generating f hat of a provisional value using the TwIST method. The generation unit 14a substitutes f hat of the provisional value that has been generated into Equation (4), thereby generating g hat of a provisional value having a higher accuracy than a random value.

The generation unit 14a repeats the process described above until a reconfigured image that is an image of the imaging target OB reconfigured on the basis of information representing an intensity of post-modulation electromagnetic waves SL reconfigured from g hat of the provisional value and a captured image acquired by imaging the imaging target OB approximate each other. In a case in which this reconfigured image and the captured image approximate each other, the generation unit 14a displays the reconfigured image on the display unit 20.

Figure 7:
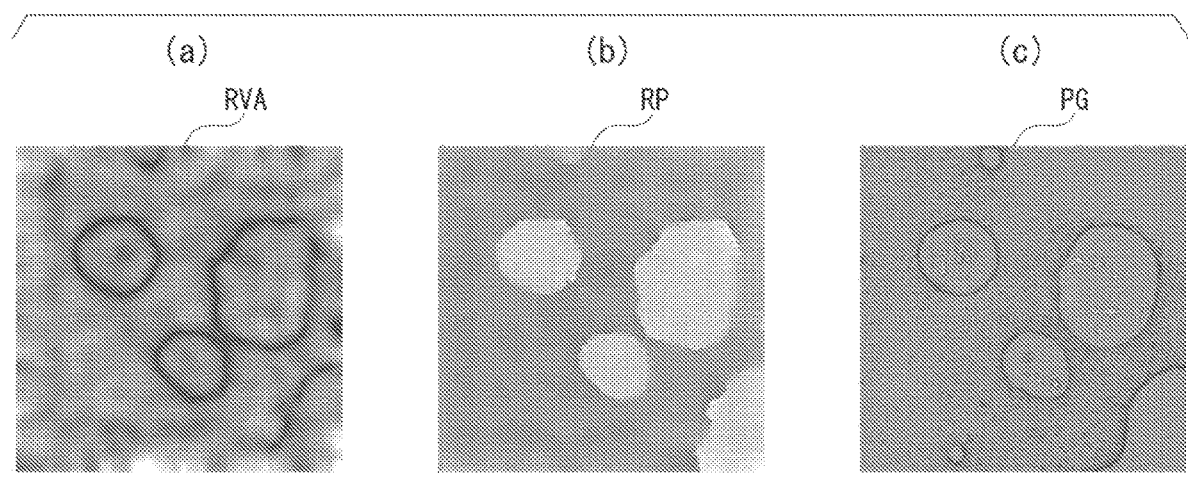
FIG. 7 is a diagram showing one example of information of a phase and an amplitude of an imaging target and a captured image acquired by imaging the imaging target using a microscope.

FIG. 7 shows one example of the information of a phase and an amplitude of an imaging target OB reconfigured by the generation unit 14a.

FIG. 7 is a diagram showing one example of information of a phase and an amplitude of an imaging target OB and a captured image acquired by imaging the imaging target OB using a microscope.

FIG. 7(a) is amplitude image information RVA having information of an amplitude of an imaging target OB reconfigured by the electromagnetic wave determining device 10a as image information. FIG. 7(b) is phase image information RP having information of a phase of an imaging target OB reconfigured by the electromagnetic wave determining device 10a as image information. FIG. 7(c) shows a captured image PG of an imaging target OB captured by a microscope.

Here, the imaging target OB shown in FIG. 7 is a mixed liquid of water and oil. In addition, the image size of the amplitude image information RVA and the phase image information RP is image information having vertical 206 pixels and horizontal 206 pixels. The post-modulation electromagnetic wave intensity determination unit 12 determined intensity information DS 7,000 times.

Here, the method of solving Equation (1) and Equation (2) is not limited to the method using alternating projections of the G-S method and the TwIST method described above.

[Summary of First Embodiment]

As described above, in the electromagnetic wave determining device 10a, a positional relation among the emission unit RL, the imaging target OB, and the variable electromagnetic wave modulating unit MPC, and the post-modulation electromagnetic wave intensity determination unit 12 is the structured determination configuration. By employing such a configuration, compared to the structured illumination configuration, the electromagnetic wave determining device 10a is appropriate for acquisition of a signal including complex amplitude information of an imaging target OB disposed relatively far.

In addition, the post-modulation electromagnetic wave intensity determination unit 12 is one-pixel determinator. This one-pixel determinator is a determinator corresponding to more types of wavelengths than those of an image sensor having a plurality of pixels. By changing this single light determinator to a determinator capable of determining a desired wavelength, the electromagnetic wave determining device 10a can determine more types of wavelengths than those of an image sensor having a plurality of pixels. Accordingly, the electromagnetic wave determining device 10a can acquire a signal including a phase and an amplitude of electromagnetic waves regardless of a frequency of electromagnetic waves emitted from the emission unit RL.

In addition, the electromagnetic wave determining device 10a includes the generation unit 14a. The generation unit 14a can generate information of a phase or an amplitude of the imaging target OB on the basis of a plurality of pieces of intensity information DS determined by the post-modulation electromagnetic wave intensity determination unit 12 and the modulation state MS of the variable electromagnetic wave modulating unit MPC at the time of determining the intensity information DS. In this way, an imaging target such as a cell can be observed without performing a dying process or the like for an observation, and the dying cost can be suppressed. In addition, the influence of dying and the like on a cell can be suppressed, and accordingly, a cell after an observation can be returned to a living body. This minimally-invasive observation method has been requested for regenerative medicine and the like.

In addition, the generation unit 14a generates the information of a phase of the imaging target OB. Accordingly, a refractive index and the like of the imaging target OB can be observed with being compared with a captured image that is information of an amplitude of light.

In addition, in the description presented above, although a case in which the variable electromagnetic wave modulating unit MPC is a spatial light modulator, the variable electromagnetic wave modulating unit MPC is not limited thereto. The variable electromagnetic wave modulating unit MPC may modulate one or both of an amplitude and a phase of electromagnetic waves. In other words, the electromagnetic wave modulating unit MP has a random pattern. This random pattern is a pattern of which a degree of modulation of a phase is random on the spatial frequency. In addition, this random pattern is a pattern in which the amplitude almost uniformly extends on the spatial frequency. This pattern in which a degree of modulation of a phase is random, and an amplitude almost uniformly extends in the frequency space is a pattern in which the plurality of areas described above have random degrees of modulation in the actual space. The electromagnetic wave modulating unit MP may be in any modulation state MS, and information of a phase or an amplitude of an imaging target OB can be reconfigured regardless of the imaging target OB. More specifically, the variable electromagnetic wave modulating unit MPC may be a liquid crystal display, a desk, a paper sheet, or the like. In a case in which the modulation state MS of the variable electromagnetic wave modulating unit MPC cannot be changed by the change unit 11 using an electric signal or the like, the variable electromagnetic wave modulating unit MPC may be replaced with an electromagnetic wave modulating unit having a modulation state MS physically different from that of the variable electromagnetic wave modulating unit MPC. In such a case, the change unit 11 may not supply the modulation state MS of the variable electromagnetic wave modulating unit MPC after replacement to the operation unit 30 or the like.

In addition, the variable electromagnetic wave modulating unit MPC may modulate only the amplitude of electromagnetic waves and maintain the phase of the electromagnetic waves as being constant. The variable electromagnetic wave modulating unit MPC may modulate only the phase of electromagnetic waves and maintain the amplitude of the electromagnetic waves as being constant. The variable electromagnetic wave modulating unit MPC may modulate both the amplitude and the phase of electromagnetic waves.

Second Embodiment

[One Example of Electromagnetic Wave Determining Device Having Structured Illumination Configuration]

Next, one example of a case in which the electromagnetic wave determining device 10 described above has a structured illumination configuration will be described with reference to FIG. 8. The same reference sign will be assigned to a configuration and an operation that are the same as those according to the first embodiment, and a description thereof will not be presented here.

Figure 8:
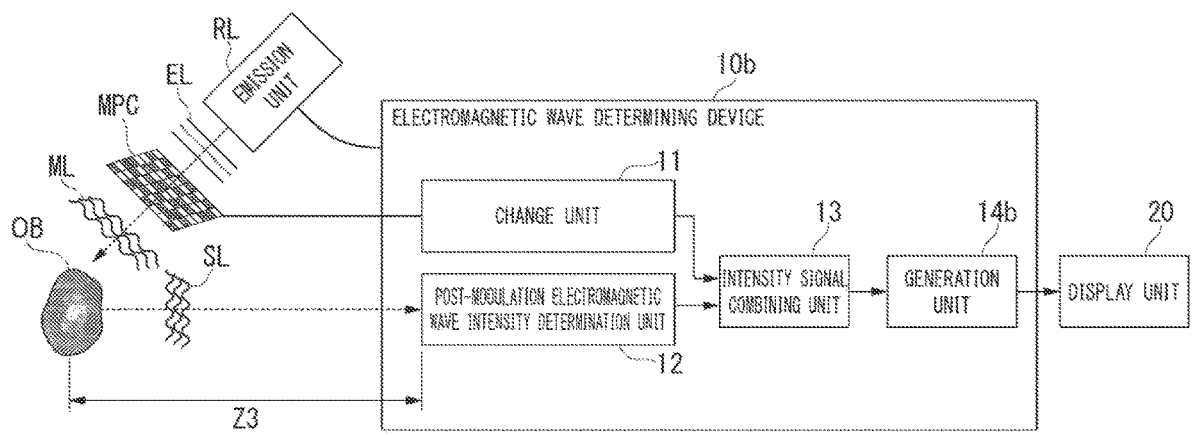
FIG. 8 is a diagram showing one example of the configuration of an electromagnetic wave determining device having structured illumination.

FIG. 8 is a diagram showing one example of the configuration of an electromagnetic wave determining device 10b having a structured illumination configuration.

The electromagnetic wave determining device 10b includes an emission unit RL, a variable electromagnetic wave modulating unit MPC, a change unit 11, a post-modulation electromagnetic wave intensity determination unit 12, an intensity signal combining unit 13, and a generation unit 14b.

Electromagnetic waves EL emitted from the emission unit RL are modulated by the variable electromagnetic wave modulating unit MPC. These modulated electromagnetic waves are electromagnetic waves ML.

The intensity signal combining unit 13 supplies combined intensity information DST to the generation unit 14b.

The generation unit 14b acquires the combined intensity information DST from the intensity signal combining unit 13. The generation unit 14b calculates a complex amplitude including information of a phase or an amplitude of an imaging target OB on the basis of the combined intensity information DST acquired from the intensity signal combining unit 13. More specifically, the generation unit 14b generates complex amplitude information representing at least a phase or an amplitude of the electromagnetic waves FL from the imaging target OB on the basis of the combined intensity information DST and contribution information representing a degree of contribution of modulation of the electromagnetic wave modulating unit MP. The generation unit 14b causes a display unit 20 to display the generated information of the phase or the amplitude as image information. The display unit 20 displays the image information generated by the generation unit 14b.

[Overview of Operation of Electromagnetic Wave Determining Device Having Structured Determination Configuration]

One example of the operation of the electromagnetic wave determining device 10b will be described.

In the electromagnetic wave determining device 10b, a method of calculating complex amplitude information of Step S160 in a flowchart shown in FIG. 4 is different from that of the structured illumination configuration. In this embodiment, a case will be described in which a distance between the imaging target OB and the post-modulation electromagnetic wave intensity determination unit 12 is a distance z2.

[Method of Calculating Complex Amplitude Information Having Structured Illumination Configuration]

Next, a method used by the generation unit 14b for calculating complex amplitude information in Step S160 described above will be described.

In the case of structured illumination, calculation is performed by assuming that the position of the variable electromagnetic wave modulating unit MPC is the same as the position of the imaging target OB. More specifically, calculation is performed with an auxiliary plane a disposed on the imaging target OB. In other words, as represented in Equation (12), complex amplitudes of the auxiliary plane a and the imaging target OB are the same.

[Math. 12]

$$a = f \tag{12}$$

The generation unit 14b generates information representing a phase and an amplitude of the imaging target OB by performing sparsity-constrained operation on the basis of the sparsity of the imaging target on the basis of a plurality of pieces of intensity information DS and modulation states MS included in the combined intensity information DST. More specifically, the generation unit 14b generates complex amplitude information of the imaging target OB using Equations (12), (13), (14), and (15).

[Math. 13]

$$|g|^2 = |MP_{z2} a|^2 \tag{13}$$

Equation (13) is a forward problem. $P_{z2}$ included in Equation (13) is a Toeplitz matrix representing Fresnel propagation from the imaging target OB to the post-modulation electromagnetic wave intensity determination unit 12.

[Math. 14]

$$\hat{f} = \mathrm{argmin}_f \|a - f\|\ell_2 + \tau \psi[f] \tag{14}$$

Equation (14) is an inverse problem.

[Math. 15]

$$\hat{g} = \mathrm{argmin}_g \||g|^2 - |MP_{z2} a|^2\| \ell_2 \tag{15}$$

This Equation (15), similar to Equation (14) described above, is an inverse problem as well. $P_{z2}$ included in Equation (15) is a Toeplitz matrix representing Fresnel propagation from the imaging target OB to the post-modulation electromagnetic wave intensity determination unit 12.

[Solution Using Auxiliary Plane]

In the following description, the generation unit 14b generate complex amplitude information g using an alternating projection.

The generation unit 14b sets an auxiliary plane a between an imaging target OB and an imaging device. By assuming the auxiliary plane a, Equation (13) can be represented using Equation (14) and Equation (15). The auxiliary plane a is generated by solving a linear problem.

In addition, the auxiliary plane a is generated by performing an inverse Fresnel transform of g hat of a provisional value included in Equation (15). In other words, by solving a phase estimation problem, the generation unit 14b can generate complex amplitude information g.

The generation unit 14b sets a provisional value in the complex amplitude information g as an initial value. The provisional value of the complex amplitude information g as the initial value may be any value. The generation unit 14b substitutes the auxiliary plane a in which the provisional value is set into Equation (15). The generation unit 14b solves Equation (15) using a G-S method, thereby generating g hat of the provisional value. Here, the G-S method is a repetitive-type phase estimation method. In addition, the generation unit 14b divides each piece of intensity information DS included in the combined intensity information DST by the complex amplitude information at the position of the distance z2 and the intensity of the auxiliary plane a in units of elements. The generation unit 14b multiplies a value acquired by raising the value divided in units of elements to the power of "$\frac{1}{2}$", the complex amplitude information at the position of the distance z2 and the auxiliary plane a in units of elements, thereby generating g hat of the provisional value. The generation unit 14b performs an inverse Fresnel transform of the generated g hat of the provisional value, thereby generating an auxiliary plane a of the provisional value.

The generation unit 14b causes f of the provisional value to propagate. The generation unit 14b generates an auxiliary plane a using Equation (15) using f of the provisional value that has been caused to propagate as an initial value.

In other words, the generation unit 14b, by substituting a random value in the initial value of the complex amplitude information g, generates an auxiliary plane a using the G-S method. The generation unit 14b substitutes the generated auxiliary plane a into Equation (14), thereby generating f of the provisional value using the TwIST method. The generation unit 14b substitutes f of the provisional value f that has been generated into Equation (15), thereby generating g hat of the provisional value having a higher accuracy than that in the case of the random value.

The generation unit 14b repeats the process described above until information representing an intensity included in the complex amplitude g of post-modulation electromagnetic waves SL reconfigured from g hat of the provisional value and a captured image acquired by the imaging target OB using the imaging unit 11 approximate each other.

In addition, the method for solving Equation (14) and Equation (15) is not limited to a method of alternating projections of the G-S method and the TwIST method described above.

[Summary of Second Embodiment]

As described above, in the electromagnetic wave determining device 10b, a positional relation among the emission unit RL, the imaging target OB, the variable electromagnetic wave modulating unit MPC, and the post-modulation electromagnetic wave intensity determination unit 12 is the structured illumination configuration. By employing such a configuration, the electromagnetic wave determining device 10b can further weaken the strength of electromagnetic waves EL emitted to the imaging target OB than in the case of the structured determination configuration. By weakening the strength of the electromagnetic waves EL, the influence of the electromagnetic waves EL on the imaging target OB can be suppressed. In other words, the electromagnetic wave determining device 10b has lower invasiveness for the imaging target OB than in the case of the structured determination configuration.

[Case in which Imaging Target OB Moves Relative to Fixed Electromagnetic Wave Modulating Unit MPS]

Figure 9:
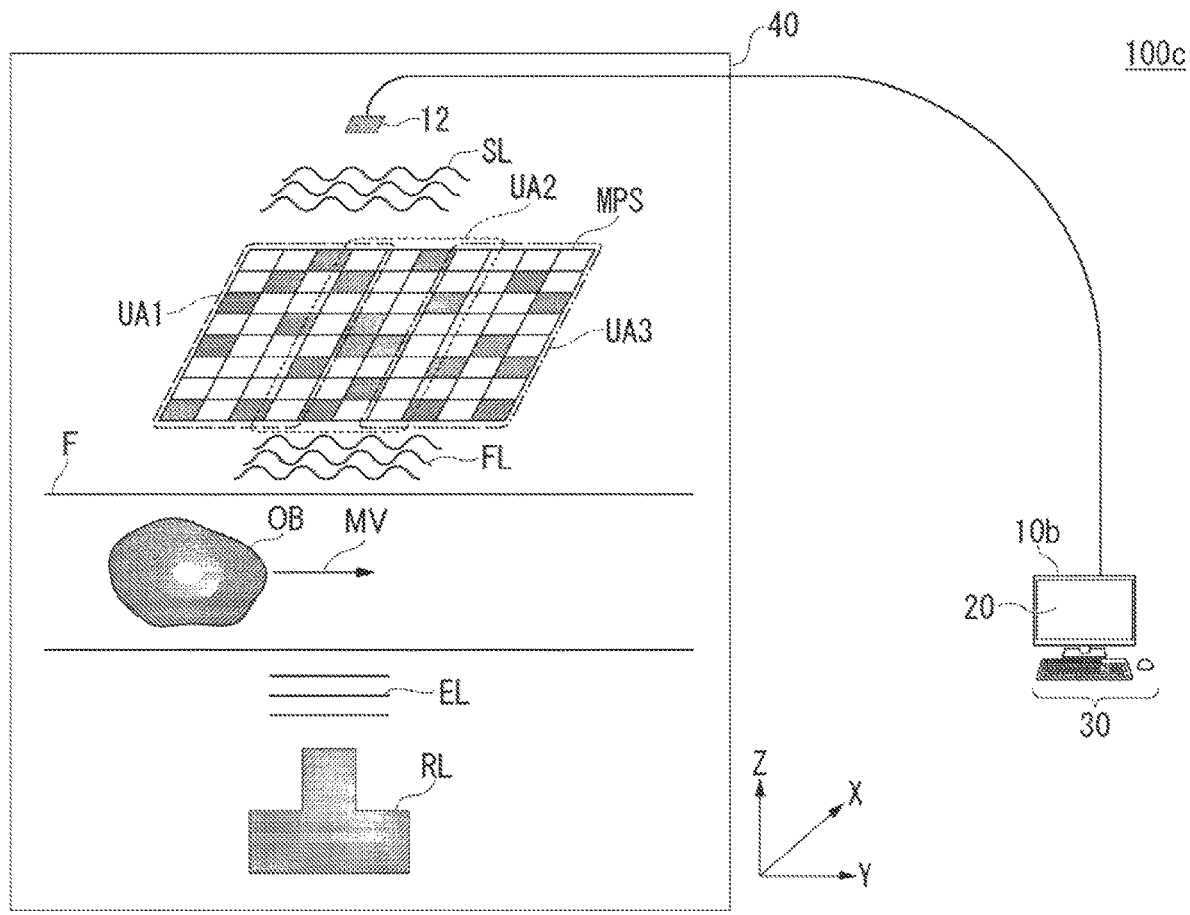
FIG. 9 is a diagram showing one example of post-modulation electromagnetic waves modulated through an imaging target moving relative to a fixed electromagnetic wave modulating unit.

Next, one example of the configuration of a case in which an imaging target OB moves relative to a fixed electromagnetic wave modulating unit MPS will be described with reference to FIG. 9. Here, the fixed electromagnetic wave modulating unit MPS is an electromagnetic wave modulating unit of which the modulation state MS is fixed. FIG. 9 is a diagram showing one example of post-modulation electromagnetic waves SL modulated through an imaging target OB moving relative to a fixed electromagnetic wave modulating unit MPS. In FIG. 9, an XYZ coordinate system is shown as a three-dimensional orthogonal coordinate system. In this embodiment, the direction of a Z axis is the direction of an optical axis of electromagnetic waves output from the emission unit RL. In addition, the imaging target OB moves in the +Y direction of the direction of the Y axis. The direction of the X axis is a depth direction of the flow cytometer 40.

An electromagnetic wave determining system 100c includes an electromagnetic wave determining device 10 and a flow cytometer 40. In this example, in the electromagnetic wave determining device 10, an emission unit RL, a fixed electromagnetic wave modulating unit MPS, and a post-modulation electromagnetic wave intensity determination unit 12 included in the flow cytometer 40 determine post-modulation electromagnetic waves SL modulated by an imaging target OB moving in a flow passage F and a fixed electromagnetic wave modulating unit MPS. The fixed electromagnetic wave modulating unit MPS is one example of the electromagnetic wave modulating unit MP. In addition, the fixed electromagnetic wave modulating unit MPS is the electromagnetic wave modulating unit MP of which the modulation state MS does not change. The flow passage F is a mechanism that moves the imaging target OB relative to the fixed electromagnetic wave modulating unit MPS when a cell and the like flow together with a solution. The cell is an observation target as the imaging target OB. The electromagnetic waves EL are emitted from the emission unit RL to the flow passage F.

The imaging target OB moves along the flow passage F. The solution inside the flow passage F moves the moving target OB from the origin in the +Y axis direction. More specifically, in this embodiment, the imaging target OB moves in a direction MV that is the direction of the +Y axis.

The post-modulation electromagnetic wave intensity determination unit 12 determines electromagnetic waves modulated by the moving imaging target OB and the fixed electromagnetic wave modulating unit MPS. The electromagnetic wave determining device 10 shown in FIG. 9 shows a case of the structured determination configuration described in the first embodiment described above. This electromagnetic wave determining device 10 may have the structured illumination configuration described in the second embodiment described above.

Next, the modulation state MS of a case in which an imaging target OB moves relative to the fixed electromagnetic wave modulating unit MPS will be described with reference to FIG. 10.

Figure 10:
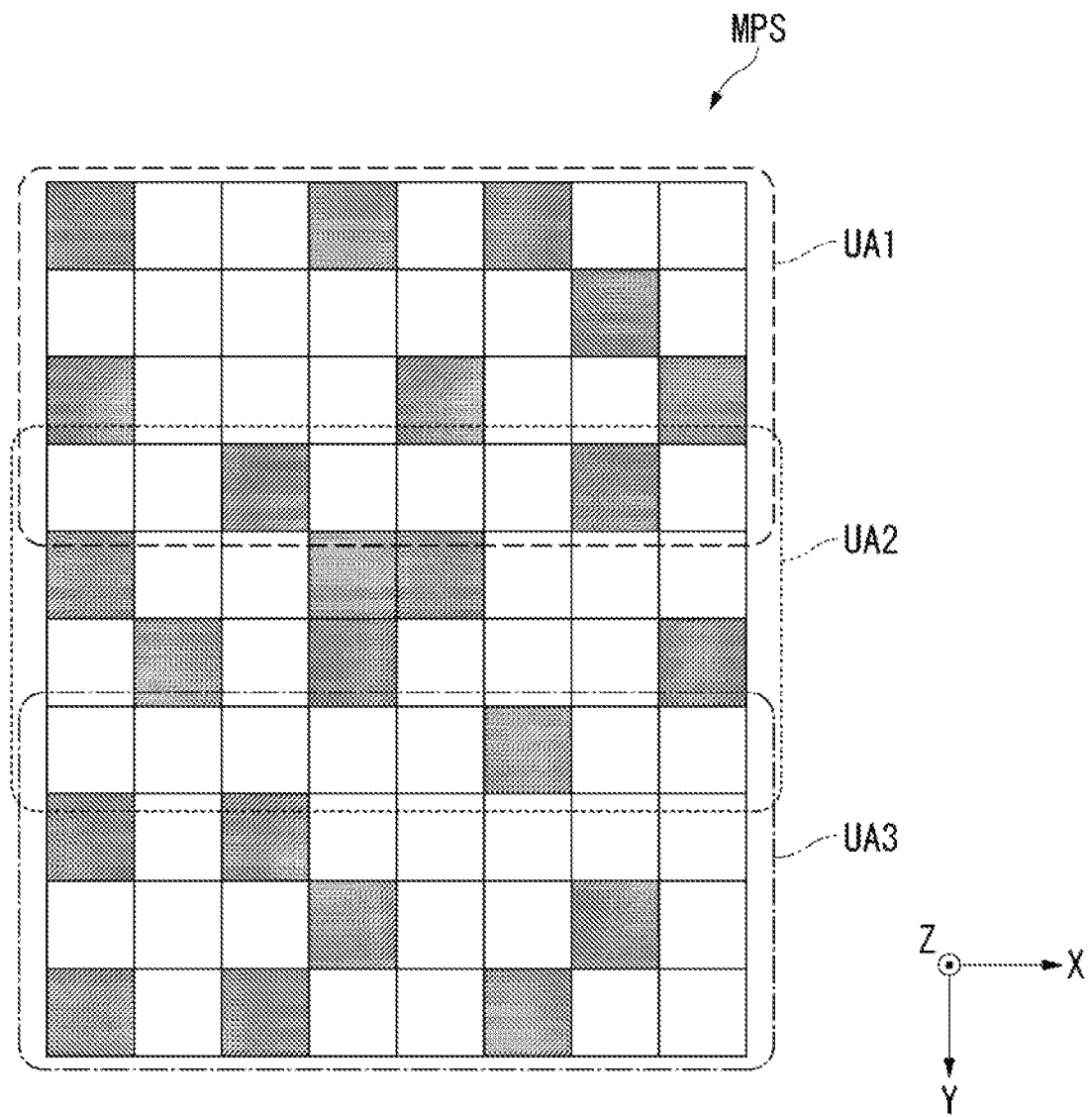
FIG. 10 is a diagram showing one example of a modulation state of a fixed electromagnetic wave modulating unit.

FIG. 10 is a diagram showing one example of the modulation state MS of the fixed electromagnetic wave modulating unit MPS. The fixed electromagnetic wave modulating unit MPS shown in FIG. 10 is a case in which the imaging target OB shown in FIG. 9 is seen from the emission unit RL side in the direction of the Z axis. The modulation state MS changes in accordance with a size and a moving speed of the imaging target OB. Here, a case in which the imaging target OB moves along the flow passage F in the direction of the +Y axis will be described.

The electromagnetic wave determining device 10 includes a relative pattern area calculating unit not shown in the drawing. The relative pattern area calculating unit selects a pattern used for calculating complex amplitude information from the fixed electromagnetic wave modulating unit MPS on the basis of a relative position between the imaging target OB and the fixed electromagnetic wave modulating unit MPS. The relative pattern area calculating unit selects a modulation state MS according to the size and the moving speed of the imaging target OB from the fixed electromagnetic wave modulating unit MPS. The relative pattern area calculating unit supplies the selected modulation state MS to an intensity signal combining unit not shown in the drawing. More specifically, in a case in which the imaging target OB is moving at a position according to a modulation area UA1, the relative pattern area calculating unit supplies the modulation area UA1 to the intensity signal combining unit as modulation state information representing the modulation state MS. Similarly, in a case in which the imaging target OB is moving at a position according to a modulation area UA2, the relative pattern area calculating unit supplies the modulation area UA2 to the intensity signal combining unit as modulation state information representing the modulation state MS. In a case in which the imaging target OB is moving at a position according to a modulation area UA3, the relative pattern area calculating unit supplies the modulation area UA3 to the intensity signal combining unit as modulation state information representing the modulation state MS. In the following description, in a case in which the modulation areas UA1 to UA3 do not need to be distinguished from each other, each thereof will be simply referred to also as a modulation area UA.

Third Embodiment

[Configuration of electromagnetic wave determining device of structured determination in a case in which imaging target is moving]

Next, the configuration of an electromagnetic wave determining device of structured determination in a case in which an imaging target OB is moving will be described with reference to FIG. 11. The same reference sign will be assigned to a configuration and an operation that are the same as those according to the first embodiment and the second embodiment, and a description thereof will not be presented here.

Figure 11:
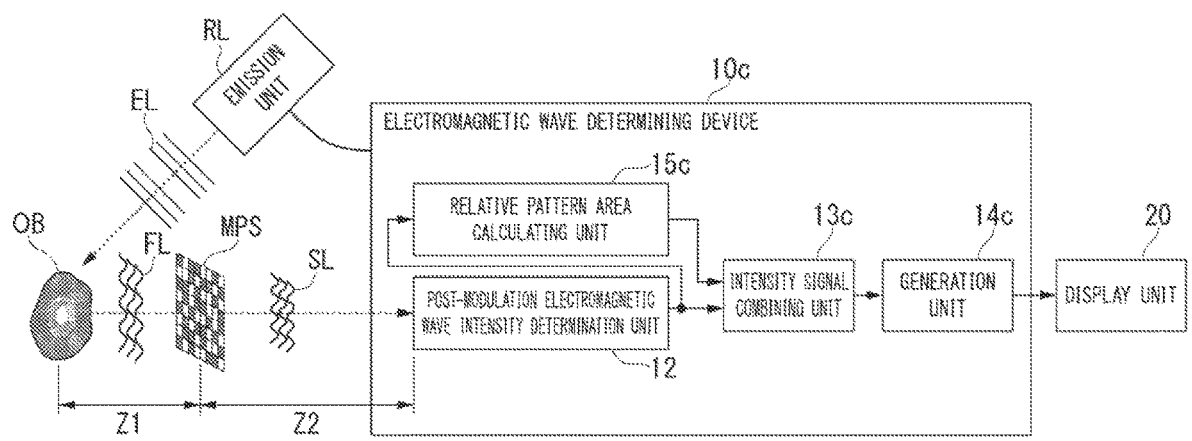
FIG. 11 is a diagram showing one example of the configuration of an electromagnetic wave determining device for structured determination in a case in which an imaging target is moving.

FIG. 11 is a diagram showing one example of the configuration of an electromagnetic wave determining device of structured determination in a case in which an imaging target OB is moving.

The electromagnetic wave determining device 10c includes an emission unit RL, a fixed electromagnetic wave modulating unit MPS, a relative pattern area calculating unit 15c, a post-modulation electromagnetic wave intensity determination unit 12, an intensity signal combining unit 13c, and a generation unit 14c.

A modulation state MS of the fixed electromagnetic wave modulating unit MPS is stored in the relative pattern area calculating unit 15c in advance. The relative pattern area calculating unit 15c acquires intensity information DS from the post-modulation electromagnetic wave intensity determination unit 12. The relative pattern area calculating unit 15c selects a modulation area UA corresponding to the intensity information DS acquired from the post-modulation electromagnetic wave intensity determination unit 12. The relative pattern area calculating unit 15c supplies modulation state information representing the modulation state MS of the selected modulation area UA to the intensity signal combining unit 13c.

The intensity signal combining unit 13c acquires the intensity information DS from the post-modulation electromagnetic wave intensity determination unit 12.

The intensity signal combining unit 13c acquires modulation state information of a position corresponding to the intensity information DS from the relative pattern area calculating unit 15c. The intensity signal combining unit 13c generates combined intensity information DST having the intensity information DS and the modulation state information that have been acquired as latest information. The intensity signal combining unit 13c stores the generated combined intensity information DST. The intensity signal combining unit 13c supplies the stored combined intensity information DST to the generation unit 14c.

The generation unit 14c acquires the combined intensity information DST from the intensity signal combining unit 13c. The generation unit 14c calculates a complex amplitude including information of a phase or an amplitude of the imaging target OB on the basis of the combined intensity information DST. More specifically, the generation unit 14c generates complex amplitude information representing at least a phase and an amplitude of electromagnetic waves FL from the imaging target OB on the basis of the combined intensity information DST and contribution information representing a degree of contribution of modulation of the electromagnetic wave modulating unit MP. The generation unit 14c causes the display unit 20 to display generated information of the phase or the amplitude as image information. The display unit 20 displays image information generated by the generation unit 14c.

[Overview of Operation of Electromagnetic Wave Determining Device of Structured Determination in a Case in which Imaging Target is Moving]

Next, an overview of the operation of the electromagnetic wave determining device 10c of structured determination in a case in which an imaging target is moving will be described with reference to FIG. 12.

Figure 12:
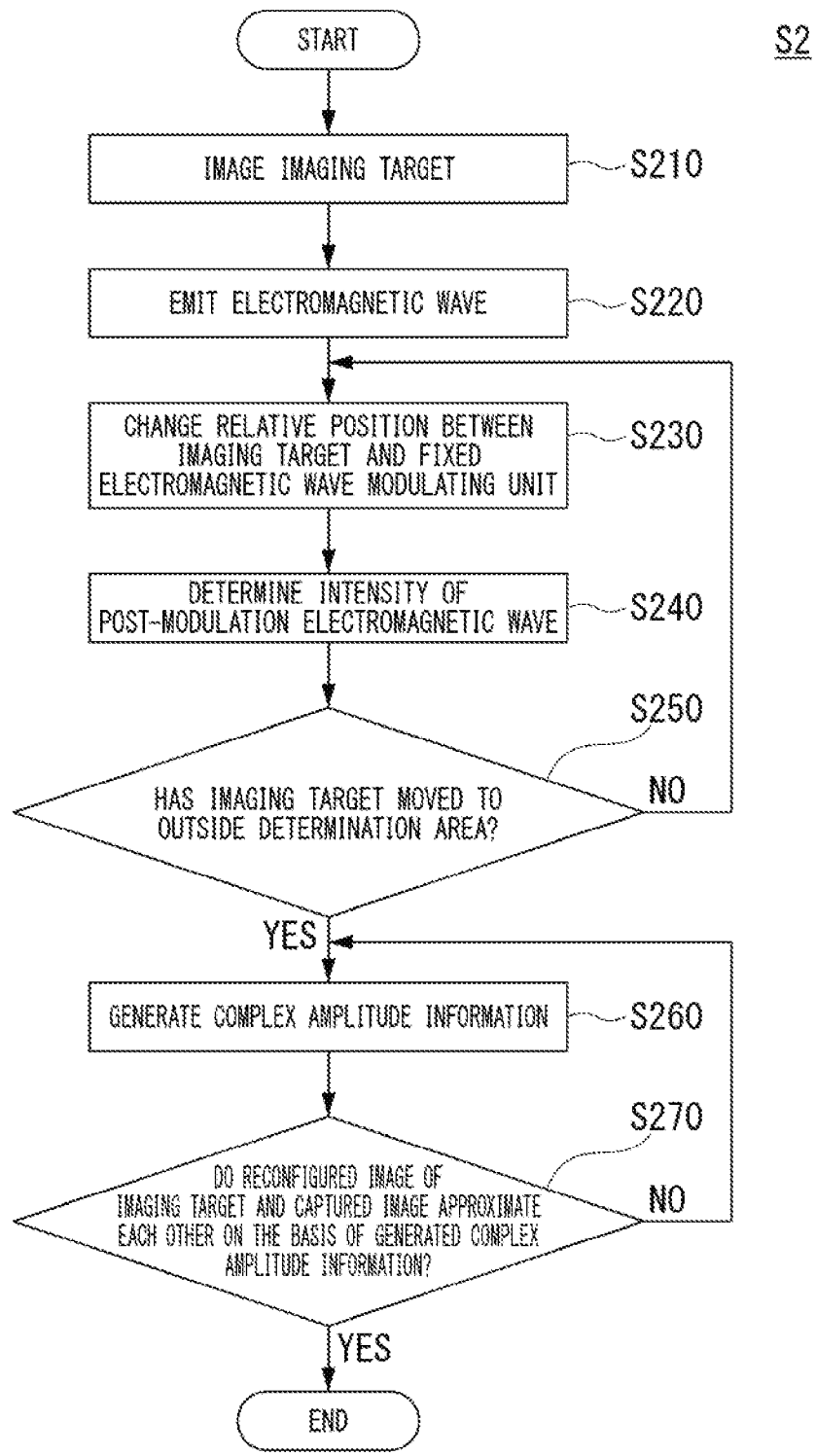
FIG. 12 a flowchart showing one example of an operation of an electromagnetic wave determining device.

FIG. 12 is a flowchart S2 showing one example of the operation of the electromagnetic wave determining device 10c.

An imaging target OB is captured using an imaging unit not shown in the drawing. The imaging unit not shown in the drawing outputs the captured image to the generation unit 14c (Step S210).

The emission unit RL emits electromagnetic waves EL to the imaging target OB and the fixed electromagnetic wave modulating unit MPS (Step S220).

A relative position between the imaging target OB and the fixed electromagnetic wave modulating unit MPS is changed (Step S230). More specifically, the imaging target OB flows through the flow passage F.

The post-modulation electromagnetic wave intensity determination unit 12 determines post-modulation electromagnetic waves SL modulated by the imaging target OB flowing through the flow passage F and the fixed electromagnetic wave modulating unit MPS (Step S240). The post-modulation electromagnetic wave intensity determination unit 12 supplies the determined intensity information DS to the intensity signal combining unit 13c. The relative pattern area calculating unit 15c supplies modulation information of a position corresponding to the determined intensity information DS to the intensity signal combining unit 13c.

The intensity signal combining unit 13c acquires the intensity information DS from the post-modulation electromagnetic wave intensity determination unit 12.

The intensity signal combining unit 13c acquires the modulation state information from the relative pattern area calculating unit 15c.

The intensity signal combining unit 13c generates combined intensity information DST. The intensity signal combining unit 13c determines whether or not the imaging target OB has moved to the outside a determination range. More specifically, the intensity signal combining unit 13c determines whether or not the imaging target OB has moved to the outside the determination range on the basis of the strength of a signal represented by the intensity information DS supplied from the post-modulation electromagnetic wave intensity determination unit 12. In a case in which the strength of the signal represented by the intensity information DS exceeds a predetermined strength, the intensity signal combining unit 13c determines that the imaging target OB is present within the determination range and repeats the process starting from Step S230 (Step S250: No).

On the other hand, in a case in which the strength of the signal represented by the intensity information DS is below the predetermined strength, the intensity signal combining unit 13c determines that the imaging target OB has moved to the outside the determination range (Step S250: Yes).

In a case in which it is determined that the imaging target OB has moved to the outside of the determination range, the intensity signal combining unit 13c outputs the combined intensity information DST to the generation unit 14c. The generation unit 14c calculates complex amplitude information on the basis of the combined intensity information DST supplied from the intensity signal combining unit 13c (Step S260). A method of calculating complex amplitude information in a case in which an imaging target is moving will be described later.

The generation unit 14c generates information of a phase or an amplitude of an imaging target OB on the basis of the information of the calculated complex amplitude. The generation unit 14c reconfigures an image of the imaging target OB on the basis of the generated information of the amplitude. The generation unit 14c compares the reconfigured image of the imaging target with the captured image captured in Step S210 described above (Step S270).

In a case in which the reconfigured image of the imaging target OB and the captured image do not approximate each other as a result of the comparison (Step S270: No), the generation unit 14c repeats the process starting from Step S260.

On the other hand, in a case in which the reconfigured image of the imaging target OB and the captured image approximate each other as a result of the comparison (Step S270: Yes), the generation unit 14c ends the process.

[Method of Calculating Complex Amplitude Information of Structured Determination Configuration of Case in which Imaging Target is Moving]

Next, a method of calculating complex amplitude information using the generation unit 14c will be described. In this embodiment, a case in which a distance between the fixed electromagnetic wave modulating unit MPS and the post-modulation electromagnetic wave intensity determination unit 12 is a distance z2 will be described.

The generation unit 14c performs a sparsity-constrained operation based on sparsity of the imaging target OB on the basis of the plurality of pieces of intensity information DS and modulation states MS included in the combined intensity information DST, thereby generating information representing a phase and an amplitude of the imaging target OB. More specifically, the generation unit 14c generates complex amplitude information of the imaging target OB on the basis of Equations (16) and (17).

[Math. 16]

$$a = P_{z1} f \tag{16}$$

Equation (16) is an equation that represents a forward problem, in other words, a problem predicted using a mathematical model.

[Math. 17]

$$|g|^2 = |M' \otimes P_{z2}' a|^2 \tag{17}$$

(Here, M'P$_{z2}$' a represents an element product of M' and P$_{z2}$)

Equation (17) is an equation that represents a forward problem, in other words, a problem predicted using a mathematical model.

The generation unit 14c can generate complex amplitude information g by solving Equations (16) and (17) using the alternating projections described above.

[Summary of Third Embodiment]

As described above, the electromagnetic wave determining device 10c includes the flow passage F, the post-modulation electromagnetic wave intensity determination unit 12, the fixed electromagnetic wave modulating unit MPS, the relative pattern area calculating unit 15c, the intensity signal combining unit 13c, and the generation unit 14c. When the imaging target OB flows through the flow passage F, a relative position between the post-modulation electromagnetic wave intensity determination unit 12 and the fixed electromagnetic wave modulating unit MPS changes. The post-modulation electromagnetic wave intensity determination unit 12 supplies the determined intensity information DS to the intensity signal combining unit 13c. The relative pattern area calculating unit 15c selects a modulation area UA disposed at a position corresponding to the moving imaging target OB. The relative pattern area calculating unit 15c supplies modulation state information of the selected modulation area UA to the intensity signal combining unit 13c. The intensity signal combining unit 13c generates combined intensity information DST in which the intensity information DS and the modulation state information of the selected modulation area UA are aligned in order of time in a state being associated with each other. In this way, the electromagnetic wave determining device 10c can determine post-modulation electromagnetic waves SL that are modulated through the imaging target OB moving in the flow passage F.

The electromagnetic wave determining device 10c calculates complex amplitude information on the basis of the intensity information DS of the determined post-modulation electromagnetic waves SL. The electromagnetic wave determining device 10c generates a phase or an amplitude of the imaging target OB on the basis of the calculated complex amplitude information. In this way, the electromagnetic wave determining device 10c can generate a phase or an amplitude of the moving imaging target OB such as a flow cytometer.

Fourth Embodiment

[Configuration of Electromagnetic Wave Determining Device of Structured Illumination in a Case in which Imaging Target is Moving]

Next, the configuration of an electromagnetic wave determining device of structured illumination in a case in which an imaging target OB is moving will be described with reference to FIG. 13. The same reference sign will be assigned to a configuration and an operation that are the same as those according to the first embodiment, the second embodiment, and the third embodiment, and a description thereof will not be presented here.

Figure 13:
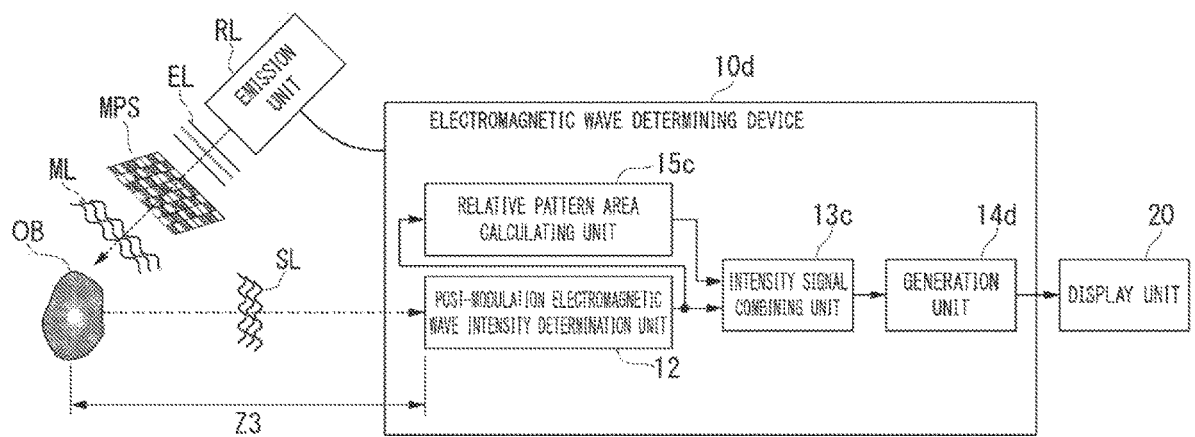
FIG. 13 is a diagram showing one example of the configuration of an electromagnetic wave determining device for structured illumination in a case in which an imaging target is moving.

FIG. 13 is a diagram showing one example of the configuration of an electromagnetic wave determining device of structured illumination in a case in which an imaging target OB is moving.

The electromagnetic wave determining device 10d includes an emission unit RL, a fixed electromagnetic wave modulating unit MPS, a relative pattern area calculating unit 15c, a post-modulation electromagnetic wave intensity determination unit 12, an intensity signal combining unit 13c, and a generation unit 14d.

The intensity signal combining unit 13c supplies combined intensity information DST to the generation unit 14d.

The generation unit 14d acquires the combined intensity information DST from the intensity signal combining unit 13c. The generation unit 14d calculates a complex amplitude including information of a phase or an amplitude of the imaging target OB on the basis of the combined intensity information DST. More specifically, the generation unit 14d generates complex amplitude information representing at least a phase and an amplitude of electromagnetic waves FL from the imaging target OB on the basis of the combined intensity information DST and contribution information representing a degree of contribution of modulation of the electromagnetic wave modulating unit MP. The generation unit 14d causes the display unit 20 to display generated information of the phase or the amplitude as image information. The display unit 20 displays image information generated by the generation unit 14d.

[Overview of Operation of Electromagnetic Wave Determining Device of Structured Illumination Configuration in a Case in which Imaging Target is Moving]

One example of the operation of the electromagnetic wave determining device 10d will be described.

In the electromagnetic wave determining device 10d, a method of calculating complex amplitude information of Step S260 in the flowchart S2 shown in FIG. 12 is different from that in the case of the structured illumination configuration.

[Method of Calculating Complex Amplitude Information of Structured Illumination Configuration in Case in which Imaging Target is Moving]

Next, a method of calculating complex amplitude information using the generation unit 14d in Step S260 described above will be described.

In the case of the structured illumination, calculation is performed by assuming that the position of the fixed electromagnetic wave modulating unit MPS is disposed at the same position as the position of the imaging target OB. More specifically, calculation is performed with an auxiliary plane a disposed on the imaging target OB.

The generation unit 14d performs a sparsity-constrained operation based on sparsity of the imaging target OB on the basis of the plurality of pieces of intensity information DS and modulation state information included in the combined intensity information DST, thereby generating information representing a phase and an amplitude of the imaging target OB. More specifically, the generation unit 14d generates complex amplitude information of the imaging target OB on the basis of Equations (12) and (17) described above. The generation unit 14d can generate complex amplitude information g by solving Equations (12) and (17) using the alternating projections described above.

[Summary of Fourth Embodiment]

As described above, the electromagnetic wave determining device 10d includes the generation unit 14d. In this way, the electromagnetic wave determining device 10d can generate the complex amplitude information of the imaging target OB. In addition, the electromagnetic wave determining device 10d can suppress the strength of electromagnetic waves EL emitted onto the imaging target Ob for the structured illumination configuration. Accordingly, invasiveness of the imaging target OB can be suppressed.

Fifth Embodiment

[Configuration of Electromagnetic Wave Determining Device Performing Machine Learning of Strength of Post-Modulation Electromagnetic Waves]

Next, the configuration of the electromagnetic wave determining device performing machine learning of strengths of post-modulation electromagnetic waves SL will be described with reference to FIG. 14. The same reference sign will be assigned to a configuration and an operation that are the same as those according to the first embodiment, the second embodiment, the third embodiment, and the fourth embodiment, and a description thereof will not be presented here.

Figure 14:
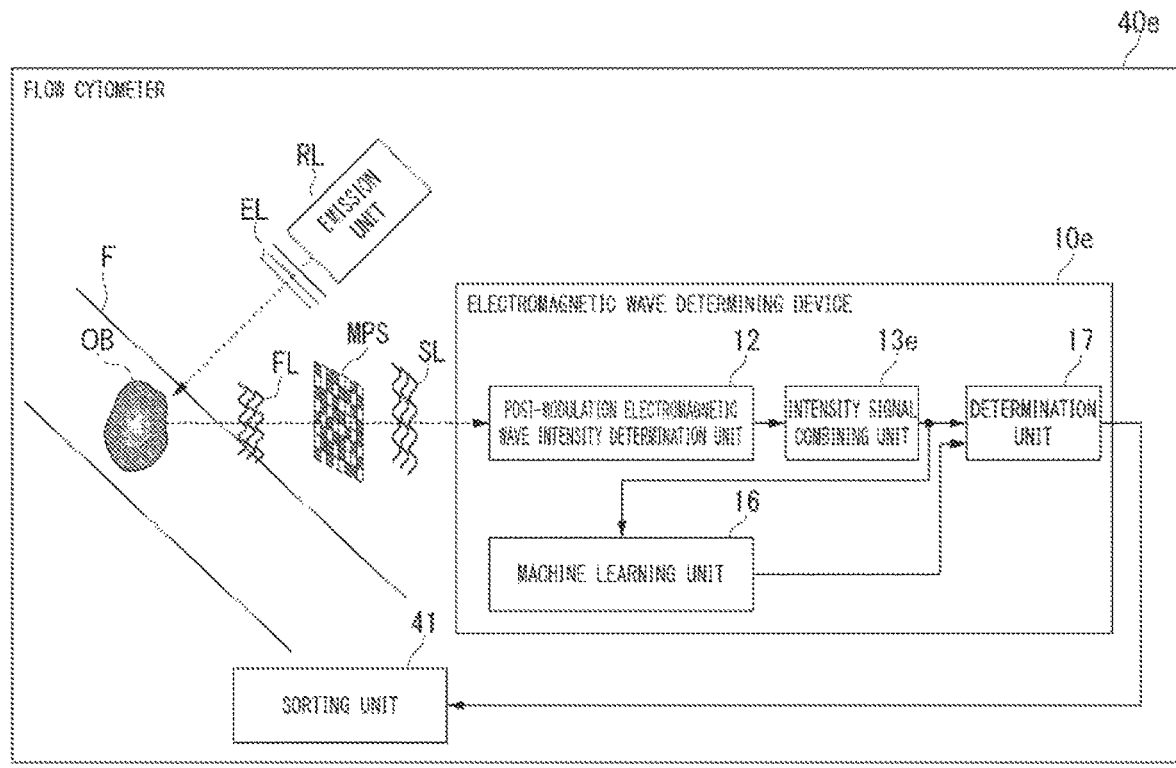
FIG. 14 is one example of the configuration of an electromagnetic wave determining device that executes machine learning of the strength of post-modulation electromagnetic waves.

FIG. 14 is a diagram showing one example of the configuration of an electromagnetic wave determining device that performs machine learning of the strengths of post-modulation electromagnetic waves SL.

A flow cytometer 40e includes a sorting unit 41 and an electromagnetic wave determining device 10e. More specifically, the flow cytometer 40e is a cell sorter. The cell sorter is a device that sorts samples such as cells flowing through the flow passage F for each type of samples. The sorting unit 41 sorts an imaging target OB flowing through the flow passage F on the basis of a result of the determination made by the electromagnetic wave determining device 10e. The electromagnetic wave determining device 10e includes an intensity signal combining unit 13e, a storage unit 16, and a determination unit 17.

The intensity signal combining unit 13e generates combined intensity information DST on the basis of intensity information DS supplied from the post-modulation electromagnetic wave intensity determination unit 12. The intensity signal combining unit 13e supplies the generated combined intensity information DST to the machine learning unit 16. The intensity signal combining unit 13e supplies the generated combined intensity information DST to the determination unit 17.

The machine learning unit 16 performs machine learning of the strength of a plurality of post-modulation electromagnetic waves determined by the post-modulation electromagnetic wave intensity determination unit 12. More specifically, the machine learning unit 16 performs machine learning on the basis of the combined intensity information DST acquired from the intensity signal combining unit 13e. More specifically, the machine learning unit 16 performs machine learning of the post-modulation electromagnetic waves SL modulated through the imaging target OB as a signal including a phase or an amplitude of the imaging target OB using a support vector machine. This machine learning unit 16 is in a state in which machine learning having a teacher has been completed in advance.

The machine learning unit 16 outputs a result of the machine learning to the determination unit 17.

The determination unit 17 determines an imaging target OB on the basis of the result of the machine learning using the machine learning unit 16 and a plurality of pieces of intensity information DS determined by the post-modulation electromagnetic wave intensity determination unit 12. The determination unit 17 supplies a result of the determination to the sorting unit 41.

The sorting unit 41 acquires the result of the determination from the determination unit 17. The sorting unit 41 sorts the imaging target OB flowing through the flow passage F on the basis of the acquired result of the determination.

[Overview of Operation of Electromagnetic Wave Determining Device Performing Machine Learning of Strength of Post-Modulation Electromagnetic Wave]

Next, an overview of the operation of the electromagnetic wave determining device 10e performing machine learning of strength of post-modulation electromagnetic waves will be described with reference to FIG. 15.

Figure 15:
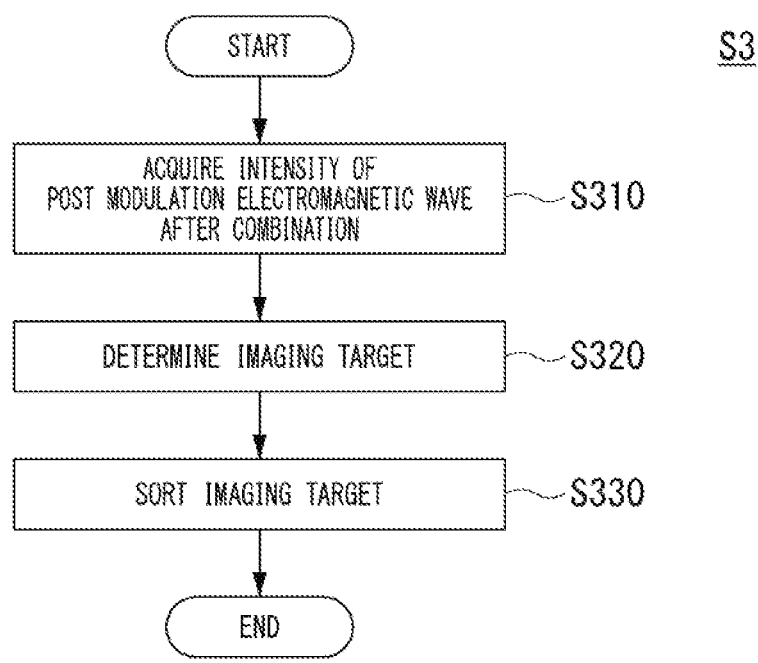
FIG. 15 is a flowchart showing one example of an operation of an electromagnetic wave determining device.

FIG. 15 is a flowchart S3 showing one example of an operation of the electromagnetic wave determining device 10e.

The determination unit 17 acquires combined intensity information DST from the intensity signal combining unit 13e (Step S310). Here, as the process of this Step S310, in a case in which an imaging target OB does not move, the processes of Steps S120 to S150; Yes in the flowchart S1 are performed. On the other hand, as the process of this Step S310, in a case in which an imaging target OB moves, the processes of Step S220 to S250; Yes are performed.

The machine learning unit 16 supplies a result of the machine learning to the determination unit 17. The determination unit 17 acquires the result of the machine learning from the machine learning unit 16. The determination unit 17 determines the imaging target OB on the basis of the combined intensity information DST and the result of the machine learning (Step S320). The determination unit 17 supplies a result of the determination to the sorting unit 41.

The sorting unit 41 acquires the result of the determination from the determination unit 17. The sorting unit 41 sorts the imaging target OB flowing through the flow passage F on the basis of the result of the determination (Step S330).

[Learning of Machine Learning Unit]

The machine learning unit 16 performs machine learning of the combined intensity information DST using a support vector machine. One example of this learning will be described.

Information used for identifying an observation target that is an imaging target OB is input to the machine learning unit 16. This observation target will be referred to also as a first observation target. More specifically, the first observation target is a cell. The information used for identifying the first observation target is information such as a name of the first observation target or the like. The machine learning unit 16 performs machine learning of the combined intensity information DST including information of a phase or an amplitude from the object observation target. In the following description, a result of the machine leaning of the first leaning observation target will be referred also to a first machine leaning result.

Information of observation targets other than the first observation target described above is input to the machine learning unit 16.

An observation target other than the first observation target will be referred to also as a second observation target. More specifically, the second observation target is a cell other than the first observation target, a contaminant, or the like. The machine learning unit 16 performs machine learning of the combined intensity information DST including a phase or an amplitude from the second observation target. In the following description, a result of the machine learning of the second observation target will be referred to also as a second machine learning result.

The machine learning unit 16 identifies whether the combined intensity information DST from the imaging target OB is a signal from the first observation target or a signal from the second observation target on the basis of the first machine learning result and the second machine learning result.

[Summary of Fifth Embodiment]

As described above, the electromagnetic wave determining device 10e includes the intensity signal combining unit 13e, the machine learning unit 16, and the determination unit 17. The machine learning unit 16 performs machine learning of the combined intensity information DST generated from the intensity signal combining unit 13e. The determination unit 17 acquires the combined intensity information DST from the intensity signal combining unit 13e. The determination unit 17 acquires machine learning results from the machine learning unit 16.

The determination unit 17 determines an imaging target OB on the basis of the combined intensity information DST and the machine learning results. In other words, the electromagnetic wave determining device 10e determines an imaging target OB on the basis of the combined intensity information DST without reconfiguring the information of a phase or an amplitude of the imaging target OB. The electromagnetic wave determining device 10e can determine an imaging target OB on the basis of a plurality of pieces of determined intensity information DS without taking a time for reconfiguring the information of the phase or the amplitude. Accordingly, the electromagnetic wave determining device 10e can determine an imaging target OB in a shorter time than a device determining an imaging target OB by reconfiguring the information of the phase or the amplitude. By shortening a time until the determination of an imaging target OB, there is a margin in a time required for driving the device until the sorting unit 41 sorts the imaging target OB or a time required for application of electric potential.

In addition, the electromagnetic wave determining device 10e can determine an imaging target OB without reconfiguring the information of the phase or the amplitude, and accordingly, compared to a case in which an imaging target OB is determined by reconfiguring the information of the phase or the amplitude, the imaging target OB can be determined on the basis of a smaller number of pieces of intensity information DS. In this way, the electromagnetic wave determining device 10e can decrease the number of times of acquisition of intensity information DS and can determine an imaging target OB at a high speed.

In addition, the electromagnetic wave determining device 10e may determine and sort an observation target without reconfiguring an image of the observation target as an imaging target OB on the basis of a result of machine learning performed in advance.

More specifically, in quality control of cells generated for regenerative medicine or cell therapy, there are requests for cell determination and cell sorting not using molecular labeling. Here, cell determination and cell sorting not using molecular labelling represents performing determination and sorting without performing a process having high invasiveness such as a fluorescent stain or the like for a cell. For such requests, by performing machine learning of intensity information DS including a phase modulated in accordance with the form of a cell, the cell can be determined and sorted in a speedy manner on the flow cytometry. For example, in regenerative medicine using a stem cell, molecular labeling is used for classifying cells into undifferentiated cells and differentiated cells. More specifically, a stem cell is a cell having both a capability of replicating the cell and a capability of being differentiated to a cell of any other systems. More specifically, a stem cell is an induced pluripotent stem cell (iPS cell) or the like.

For such stem cells, the electromagnetic wave determining device 10e, first, performs measurement for a training cell group to which molecular labeling has been attached on the flow cytometry and performs machine learning of intensity information DS to which a label of molecular labeling positivity is attached and intensity information to which a label of molecular labeling negativity is attached. In such a case, the electromagnetic wave determining device 10e may be configured to be able to identify the molecular labeling.

In addition, the electromagnetic wave determining device may be configured to acquire a result of machine learning of a training cell group for which the molecular labeling has been performed by another device.

Next, the electromagnetic wave determining device 10e can finally collect cells entering to the inside of the body by performing determination and sorting on the flow cytometry for a cell group for which molecular labeling is not performed. In other words, the electromagnetic wave determining device 10e performs machine learning of intensity information DS having a high degree of invasiveness and a high accuracy of determination of an imaging target OB in advance. The electromagnetic wave determining device 10e determines and sorts cells not using molecular labeling on the basis of the machine learning results having the high accuracy of the determination. In this way, cells entering into the inside of the body can be sorted with a high accuracy.

In the description presented above, although a case in which the electromagnetic wave determining device 10e is included in the flow cytometer 40e, the configuration is not limited thereto. In addition, a device such as a microscope other than the flow cytometer may include the electromagnetic wave determining device 10e.

In addition, in the description presented above, although a case in which the electromagnetic wave determining device 10e has the structured determination configuration has been described above, a structured illumination configuration may be employed. In addition, the imaging target OB may be configured as not moving.

Sixth Embodiment

[Change Unit Changing Modulation State of Electromagnetic Wave Modulating Unit into a Pattern Corresponding to Imaging Target]

Next, an electromagnetic wave determining device 10f changing the modulation state MS of the electromagnetic wave modulating unit MP into a pattern corresponding to an imaging target OB will be described with reference to FIGS. 16 and 17. The same reference sign will be assigned to a configuration and an operation that are the same as those according to the first embodiment, the second embodiment, the third embodiment, the fourth embodiment, and the fifth embodiment and a description thereof will not be presented here.

Figure 16:
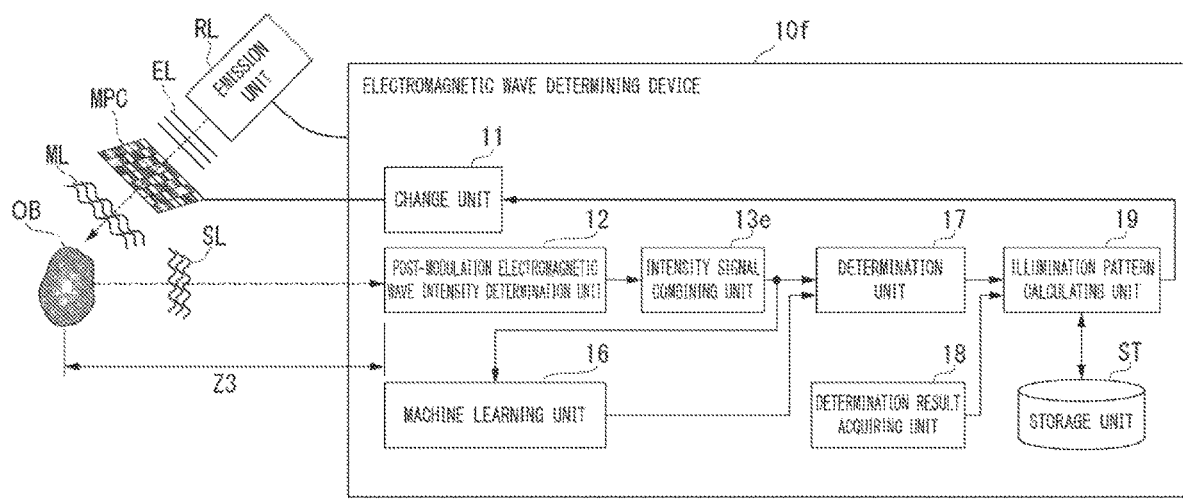
FIG. 16 is a diagram showing one example of the configuration of an electromagnetic wave determining device that changes a modulation state of a fixed electromagnetic wave modulating unit in accordance with an imaging target.

FIG. 16 is a diagram showing one example of the configuration of an electromagnetic wave determining device 10f that changes a modulation state MS of a fixed electromagnetic wave modulating unit MP in correspondence with an imaging target.

The electromagnetic wave determining device 10f includes a determination result acquiring unit 18, a storage unit ST, and a modulation pattern calculating unit 19.

A user operating the electromagnetic wave determining device 10f inputs determination correctness/incorrectness information representing whether or not a result of determination made by the determination unit 17 is correct using an operation unit 30. The determination result acquiring unit 18 acquires the determination correctness/incorrectness information. The determination result acquiring unit 18 supplies the determination correctness/incorrectness information to the modulation pattern calculating unit 19.

A plurality of modulation states MS are stored in the storage unit ST.

The modulation pattern calculating unit 19 calculates a plurality of electromagnetic wave modulating unit MP of which modulation states MS are difference from each other. More specifically, the modulation pattern calculating unit 19 acquires the determination correctness/incorrectness information from the determination result acquiring unit 18. The modulation pattern calculating unit 19 acquires a result of determination made by the determination unit 17 from the determination unit 17. The modulation pattern calculating unit 19 assigns a score to the modulation state MS of the electromagnetic wave modulating unit MP on the basis of the determination correctness/incorrectness information and the result of the determination made by the determination unit 17. In a case in which the determination unit 17 determines correctness, the modulation pattern calculating unit 19 assigns a high score. More specifically, the modulation pattern calculating unit 19 determines whether or not the determination unit 17 determines correctness for one modulation state MS a plurality of number of times. In a case in which the determination unit 17 determines correctness, the modulation pattern calculating unit 19 increases a value of the score corresponding to the modulation state MS. The modulation pattern calculating unit 19 stores the modulation state MS and the calculated score in the storage unit ST in a state being associated with each other. The modulation pattern calculating unit 19 performs the process of assigning the score to each of a plurality of the other electromagnetic wave modulating units MP of which the modulation states MS are different each other. The modulation pattern calculating unit 19 selects a pattern having a high score from among the plurality of electromagnetic wave modulating units MP.

More specifically, the modulation pattern calculating unit 19 calculate the electromagnetic wave modulating units MP of which the modulation states MS are different from each other using a genetic algorithm.

Figure 17:
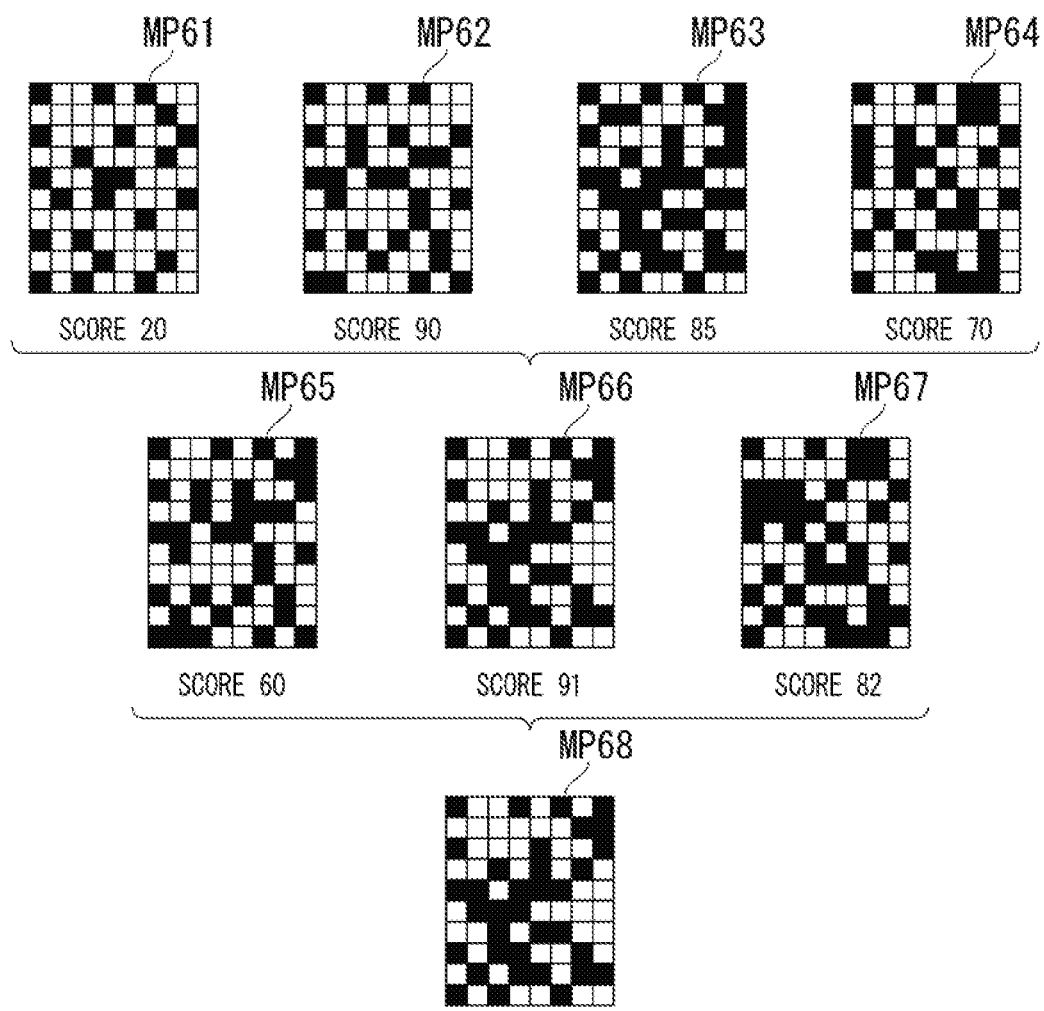
FIG. 17 is a diagram showing one example of a pattern generated using a genetic algorithm.

FIG. 17 is a diagram showing one example of a pattern generated using a genetic algorithm.

The modulation pattern calculating unit 19 calculates a score for each of the electromagnetic wave modulating units MP from the electromagnetic wave modulating unit MP61 to the electromagnetic wave modulating unit MP64. The modulation pattern calculating unit 19 calculates the electromagnetic wave modulating units MP from the electromagnetic wave modulating unit MP65 to the electromagnetic wave modulating unit MP67 on the basis of the electromagnetic wave modulating unit MP62 and the electromagnetic wave modulating unit MP65 having high scores. The modulation pattern calculating unit 19 calculates electromagnetic wave modulating units while adding and crossing variations in the modulation states MS of the electromagnetic wave modulating units MP having high scores. The modulation pattern calculating unit 19 respectively calculates scores for the electromagnetic wave modulating units MP from the electromagnetic wave modulating unit MP65 to the electromagnetic wave modulating unit MP67. The modulation pattern calculating unit 19 calculates an electromagnetic wave modulating unit MP66 having the highest score among the electromagnetic wave modulating units MP from the electromagnetic wave modulating unit MP65 to the electromagnetic wave modulating unit MP67 as the electromagnetic wave modulating unit MP68 corresponding to the imaging target OB. The modulation pattern calculating unit 19 supplies the calculated electromagnetic wave modulating unit MP68 to the change unit 11.

The modulation pattern calculating unit 19 supplies a pattern having the highest score to the change unit 11.

The change unit 11 changes the pattern included in the electromagnetic wave modulating unit MP supplied from the modulation pattern calculating unit 19 to a pattern corresponding to the imaging target OB. More specifically, the change unit 11 changes the modulation state MS to a modulation state corresponding to the imaging target OB.

[Summary of Sixth Embodiment]

As described above, the electromagnetic wave determining device 10f includes the determination result acquiring unit 18, the storage unit ST, and the modulation pattern calculating unit 19. The determination result acquiring unit 18 acquires correctness/incorrectness information representing whether or not a result of the determination made by the determination unit 17 is correct. The modulation pattern calculating unit 19 sets an electromagnetic wave modulating unit MP that has correctly determined the imaging target OB more times as an electromagnetic wave modulating unit MP including the modulation state MS corresponding to the imaging target OB on the basis of the correctness/incorrectness information acquired by the determination result acquiring unit 18 and the determination results acquired by the determination unit 17. In other words, the electromagnetic wave determining device 10f calculates a modulation state MS corresponding to the imaging target OB. In this way, the electromagnetic wave determining device 10f can calculate the electromagnetic wave modulating unit MP including the modulation state MS from which the imaging target OB can be determined more accurately than the electromagnetic wave modulating unit MP not including the modulation state MS corresponding to the imaging target OB. In this way, the electromagnetic wave determining device 10f can determine the imaging target OB with a higher accuracy.

In addition, in the description presented above, although a case in which the electromagnetic wave determining device 10f has the structured illumination configuration has been described, a structured determination configuration may be employed. In addition, although the imaging target OB has been described not to move, the imaging target OB may be configured to move. In other words, the electromagnetic wave determining device 10 according to each of the first embodiment to the fifth embodiment may include the determination result acquiring unit 18, the storage unit ST, and the modulation pattern calculating unit 19.

In addition, in the description presented above, although a case in which the electromagnetic wave determining device according to each of the first embodiment to the fourth embodiment generates a reconfigured image on the basis of the complex amplitude of the imaging target OB, it is not essential. The electromagnetic wave determining device according to each of the first embodiment to the fourth embodiment may determine post-modulation electromagnetic waves SL. In addition, the electromagnetic wave determining device may reconfigure only a phase of the imaging target OB on the basis of the calculated complex amplitude information. The electromagnetic wave determining device may reconfigure only information of an amplitude of the imaging target OB on the basis of the calculated complex amplitude information. The electromagnetic wave determining device may reconfigure information of both a phase and an amplitude of the imaging target OB on the basis of the calculated complex amplitude information.

In addition, in the third embodiment and the fourth embodiment described above, although a case in which the relative pattern area calculating unit 15c selects a modulation area UA corresponding to the position of the imaging target OB has been described, the selection is not limited thereto. The electromagnetic wave determining device 10c and the electromagnetic wave determining device 10d may select a modulation area UA corresponding to the length of a time of the determined intensity information DS from among modulation states MS.

In addition, in the third embodiment and the fourth embodiment described above, although a configuration in which the imaging target OB moves has been described, the determination side may move. More specifically, with respect to an imaging target OB that does not move, the electromagnetic wave determining device 10c and the electromagnetic wave determining device 10d may have a configuration in which the fixed electromagnetic wave modulating unit MPS and the post-modulation electromagnetic wave intensity determination unit 12 move.

In the description presented above, although a case in which the generation unit included in the first to fourth embodiments performs a sparsity-constrained operation, and complex amplitude information g is generated has been described, the complex amplitude information g may be calculated by any other device. Here, the other device is a web service operated by a server on a network or the like. In such a case, the generation unit outputs information that is required for generating the complex amplitude information g to another device. The generation unit may acquire the complex amplitude information g generated by the other device.

In addition, the electromagnetic wave determining devices according to the first to sixth embodiments described above may be any one of a transmission-type optical system and a reflection-type optical system. The transmission-type optical system, as shown in FIGS. 1 to 9 described above, observes transmission light transmitted from the imaging target OB. The reflection-type optical system, as shown in FIGS. 3, 8, 11, 13, 14, and 16 described above, observes reflection light reflected from the imaging target OB. In addition, the electromagnetic wave determining devices according to the first to sixth embodiments may measure reflection light of the electromagnetic wave modulating unit MP. Similarly, the electromagnetic wave determining devices according to the first to sixth embodiments may measure transmission light of the electromagnetic wave modulating unit MP.

As above, while the embodiments of the present invention have been described in detail with reference to the drawings, a specific configuration is not limited to these embodiments and may be appropriately changed in a range not departing from the concept of the present invention.

In addition, each of the electromagnetic wave determining device 10, the electromagnetic wave determining device 10a, the electromagnetic wave determining device 10b, the electromagnetic wave determining device 10c, the electromagnetic wave determining device 10d, the electromagnetic wave determining device 10e, and the electromagnetic wave determining device 10f has a computer inside. The procedure of each process of the device described above is stored on a computer-readable recording medium in the form of a program, and, by reading and executing the program using a computer, the process described above is executed. Here, the computer-readable recording medium is a magnetic disk, a magneto-optical disk, a CD-ROM, a DVD-ROM, a semiconductor memory, or the like. In addition, this computer program may be delivered to a computer through a communication line, and the computer that has received the computer program may execute the program.

The program may be used for realizing a part of the function described above.

Furthermore, the program may be a program that can realize the function described above in combination with a program that already has been recorded in a computer system, a so-called differential file (differential program).

REFERENCE SIGNS LIST 10, 10a, 10b, 10c, 10d, 10e, 10f Electromagnetic wave determining device
11 Change unit
12 Post-modulation electromagnetic wave intensity determination unit
13a, 13c, 13e Intensity signal combining unit
14a, 14b, 14c, 14d Generation unit
15c Relative pattern area calculating unit
16 Machine learning unit
17 Determination unit
18 Determination result acquiring unit
19 Modulation pattern calculating unit
ST Storage unit
20 Display unit
30 Operation unit
40, 40e Flow cytometer
41 Sorting unit
100 Electromagnetic wave determining system
F Flow passage
RL Emission unit
MP, MP1, MP2, MP3, MP61, MP62, MP63, MP64, MP65, MP66, MP67, MP68, MPm Electromagnetic wave modulating unit
ME1, ME2, ME3, MEm Elements
MPC Variable electromagnetic wave modulating unit
MPS Fixed electromagnetic wave modulating unit
OB Imaging target
RVA Amplitude image information
RP Phase image information
PG Captured image
UA, UA1 UA2, UA3 Modulation area
EL, FL, ML Electromagnetic waves
SL Post-modulation electromagnetic waves

The invention claimed is:

1. A device for imaging an object comprising:
a flow path configured to permit an object to flow therethrough;
an emission unit configured to emit at least one electromagnetic wave having at least partial coherence, wherein the emission unit is configured to emit the at least one electromagnetic wave towards the flow path to cause at least one optical interaction between the at least one electromagnetic wave and the object;
an electromagnetic wave modulating unit configured to modulate one or both of a phase or an amplitude of the at least one electromagnetic wave following the at least one optical interaction to produce at least one modulated electromagnetic wave, wherein the electromagnetic wave modulating unit comprises a plurality of areas configured to modulate the at least one electromagnetic wave differently;
an electromagnetic wave intensity detecting unit configured to detect at least one intensity of the at least one modulated electromagnetic wave; and
a generation unit configured to generate at least a phase image or an amplitude image of the object based at least in part on the at least one intensity of the at least one modulated electromagnetic wave detected by the electromagnetic wave intensity detecting unit.

2. The device of claim 1, wherein the electromagnetic wave modulating unit comprises at least one modulation pattern.

3. The device of claim 2, wherein the at least one modulation pattern comprises a fixed modulation pattern or a random pattern.

4. The device of claim 1, further comprising a relative pattern area calculating unit configured to select a modulation area corresponding to the at least one intensity of the at least one modulated electromagnetic wave detected by the electromagnetic wave intensity detecting unit.

5. The device of claim 1, wherein the generation unit is configured to generate the at least the phase image or the amplitude image by performing a sparsity-constrained operation on the at least one intensity of the at least one modulated electromagnetic wave based on a sparsity of the object.

6. The device of claim 1, wherein the electromagnetic wave intensity detecting unit comprises a single-pixel detector.

7. A method for imaging an object comprising:
(a) emitting at least one electromagnetic wave, having at least partial coherence, towards a flow path to cause at least one optical interaction between the at least one electromagnetic wave and the object;
(b) directing an electromagnetic wave modulating unit to modulate one or both of a phase or an amplitude of the at least one electromagnetic wave following the at least one optical interaction to produce at least one modulated electromagnetic wave, wherein the electromagnetic wave modulating unit comprises a plurality of areas configured to modulate the at least one electromagnetic wave differently;
(c) detecting at least one intensity of the at least one modulated electromagnetic wave; and
(d) generating at least a phase image or an amplitude image of the object based at least in part on the at least one intensity of the at least one modulated electromagnetic wave detected in (c).

8. The method of claim 7, wherein the electromagnetic wave modulating unit comprises at least one modulation pattern.

9. The method of claim 8, wherein the at least one modulation pattern comprises a fixed modulation pattern or a random pattern.

10. The method of claim 7, further comprising selecting a modulation area corresponding to the at least one intensity of the at least one modulated electromagnetic wave detected in (c).

11. The method of claim 7, wherein generating the at least the phase image or the amplitude image comprises performing a sparsity-constrained operation on the at least one intensity of the at least one modulated electromagnetic wave based on a sparsity of the object.

12. The method of claim 8, wherein the at least one modulation pattern is selected based on the object.

13. The method of claim 7, wherein the at least one intensity of the at least one modulated electromagnetic wave is detected using a single-pixel detector.

14. A non-transitory computer-readable medium comprising machine-executable code that, upon execution by one or more computer processors, implements a method for imaging an object flowing through a flow path:
(a) emitting at least one electromagnetic wave, having at least partial coherence, towards a flow path to cause at least one optical interaction between the at least one electromagnetic wave and the object;
(b) directing an electromagnetic wave modulating unit to modulate one or both of a phase or an amplitude of the at least one electromagnetic wave following the at least one optical interaction to produce at least one modulated electromagnetic wave, wherein the electromagnetic wave modulating unit comprises a plurality of areas configured to modulate the at least one electromagnetic wave differently;
(c) detecting at least one intensity of the at least one modulated electromagnetic wave; and
(d) generating at least a phase image or an amplitude image of the object based at least in part on the at least one intensity of the at least one modulated electromagnetic wave detected in (c).

15. The non-transitory computer-readable medium of claim 14, wherein the electromagnetic wave modulating unit comprises at least one modulation pattern.

16. The non-transitory computer-readable medium of claim 15, wherein the at least one modulation pattern comprises a fixed modulation pattern or a random pattern.

17. The non-transitory computer-readable medium of claim 14, wherein the method further comprises selecting a modulation area corresponding to the at least one intensity of the at least one modulated electromagnetic wave detected in (c).

18. The non-transitory computer-readable medium of claim 14, wherein generating the at least the phase image or the amplitude image comprises performing a sparsity-constrained operation on the at least one intensity of the at least one modulated electromagnetic wave based on a sparsity of the object.

19. The non-transitory computer-readable medium of claim 14, wherein the at least one intensity of the at least one modulated electromagnetic wave is detected using a single-pixel detector.

20. The non-transitory computer-readable medium of claim 15, wherein the at least one modulation pattern is selected based on the object.

* * * * *